(12) United States Patent　　(10) Patent No.:　US 12,587,924 B2
Perras et al.　　(45) Date of Patent:　Mar. 24, 2026

(54) METHODS, APPARATUSES AND SYSTEMS DIRECTED TO A CHANGE OF WTRU TO WTRU RELAY

(71) Applicant: InterDigital Patent Holdings, Inc., Wilmington, DE (US)

(72) Inventors: Michelle Perras, Montréal (CA); Samir Ferdi, Kirkland (CA); Alec Brusilovsky, Downingtown, PA (US); Xiaoyan Shi, Westmount (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 389 days.

(21) Appl. No.: 17/916,304

(22) PCT Filed: Apr. 6, 2021

(86) PCT No.: PCT/US2021/025989
　§ 371 (c)(1),
　(2) Date: Sep. 30, 2022

(87) PCT Pub. No.: WO2021/207219
　PCT Pub. Date: Oct. 14, 2021

(65)　Prior Publication Data

US 2023/0224778 A1　Jul. 13, 2023

Related U.S. Application Data

(60) Provisional application No. 63/007,008, filed on Apr. 8, 2020.

(51) Int. Cl.
　*H04W 36/08*　　(2009.01)
　*H04W 36/00*　　(2009.01)

(52) U.S. Cl.
　CPC ....... *H04W 36/08* (2013.01); *H04W 36/0038* (2013.01); *H04W 36/00835* (2018.08); *H04W 36/00837* (2018.08); *H04W 36/037* (2023.05)

(58) Field of Classification Search
　None
　See application file for complete search history.

(56)　References Cited

U.S. PATENT DOCUMENTS 9,155,002 B2 * 10/2015 Jang .................... H04W 36/302
10,326,516 B2 * 6/2019 Zhao .................... H04W 36/302
　　(Continued)

FOREIGN PATENT DOCUMENTS

CN　　112839374 A　　5/2021
CN　　114846841 A　　8/2022
　　(Continued)

OTHER PUBLICATIONS

Anonymous, "Architecture enhancements for 5G System (5GS) to support Vehicle-to-Everything (V2X) services", 3rd Generation Partnership Project (3GPP), Technical Specification Group Services and System Aspects, Document: 3GPP TS 23.287 v16.2.0, Release Mar. 16, 2020, 53 pages.

(Continued)

*Primary Examiner* — Gregory B Sefcheck
*Assistant Examiner* — Benjamin Peter Welte
(74) *Attorney, Agent, or Firm* — VOLPE KOENIG

(57)　　ABSTRACT

Methods, apparatuses, systems, etc., directed to performing a change of relay are disclosed herein. In an embodiment, a WTRU may transmit a link modification request message to a target WTRU via a first relay WTRU for requesting a change of relay. The WTRU may receive a link modification accept message from the target WTRU via the first relay WTRU, indicating a (e.g., proposed) second relay WTRU (e.g., identifier). The WTRU may transmit a direct commu- (Continued)

nication request message including the second relay WTRU identifier for indicating to the target WTRU acceptance of the proposed second relay WTRU. The WTRU may a receiving a direct communication accept message from the target WTRU via the second relay WTRU, indicating the traffic may be relayed via the second relay WTRU.

20 Claims, 15 Drawing Sheets

(56) References Cited

U.S. PATENT DOCUMENTS

| | | | | |
|---|---|---|---|---|
| 10,492,120 | B2 * | 11/2019 | Yasukawa | H04W 76/10 |
| 11,239,898 | B1 | 2/2022 | Chandra et al. | |
| 11,638,132 | B2 | 4/2023 | Perras et al. | |
| 2005/0135305 | A1 * | 6/2005 | Wentink | H04W 88/04 |
| 2006/0105709 | A1 | 5/2006 | Oh et al. | |
| 2007/0297367 | A1 | 12/2007 | Wang et al. | |
| 2011/0238997 | A1 | 9/2011 | Bellur et al. | |
| 2014/0032905 | A1 | 1/2014 | Long et al. | |
| 2014/0119544 | A1 | 5/2014 | Lee | |
| 2014/0135019 | A1 | 5/2014 | Jang et al. | |
| 2014/0215135 | A1 | 7/2014 | Park et al. | |
| 2016/0100353 | A1 * | 4/2016 | Gleixner | H04M 15/81 |
| | | | | 370/329 |
| 2017/0202038 | A1 | 7/2017 | Ahmad | |
| 2017/0245245 | A1 | 8/2017 | Kim et al. | |
| 2017/0289098 | A1 | 10/2017 | Chun et al. | |
| 2018/0077241 | A1 | 3/2018 | Byun et al. | |
| 2018/0084481 | A1 * | 3/2018 | Wang | H04W 88/04 |
| 2018/0152234 | A1 | 5/2018 | Huang et al. | |
| 2018/0159935 | A1 | 6/2018 | Cavalcanti et al. | |
| 2018/0254820 | A1 | 9/2018 | Chae et al. | |
| 2019/0053251 | A1 | 2/2019 | Loehr et al. | |
| 2019/0089547 | A1 | 3/2019 | Simplicio, Jr. et al. | |
| 2019/0223008 | A1 | 7/2019 | Vanderveen et al. | |
| 2019/0254103 | A1 * | 8/2019 | Nord | H04W 8/005 |
| 2020/0100088 | A1 | 3/2020 | Kim et al. | |
| 2020/0145798 | A1 | 5/2020 | Kim et al. | |
| 2020/0178048 | A1 | 6/2020 | Kim et al. | |
| 2020/0336258 | A1 | 10/2020 | Zhu et al. | |
| 2021/0144781 | A1 | 5/2021 | Xu et al. | |
| 2021/0153063 | A1 * | 5/2021 | Zhang | H04W 88/04 |
| 2021/0211870 | A1 | 7/2021 | Perras et al. | |
| 2021/0336967 | A1 * | 10/2021 | Yasukawa | H04W 40/22 |
| 2022/0007445 | A1 | 1/2022 | Pan et al. | |
| 2022/0369215 | A1 * | 11/2022 | Dees | H04W 88/04 |
| 2022/0377524 | A1 | 11/2022 | Ferdi et al. | |
| 2023/0032220 | A1 | 2/2023 | Guo et al. | |
| 2023/0269573 | A1 * | 8/2023 | Orsino | H04W 88/04 |

FOREIGN PATENT DOCUMENTS

| | | | |
|---|---|---|---|
| CN | 113011765 | B | 10/2022 |
| EP | 2733988 | A2 | 5/2014 |
| EP | 3185612 | A1 | 6/2017 |
| EP | 3280209 | A1 | 2/2018 |
| JP | 2021027585 | A | 2/2021 |
| RU | 2400942 | C1 | 9/2010 |
| WO | 2016122533 | A1 | 8/2016 |
| WO | 2017027355 | A1 | 2/2017 |
| WO | 2017173072 | A1 | 10/2017 |
| WO | 2018066876 | A1 | 4/2018 |
| WO | 2018128505 | A1 | 7/2018 |
| WO | 2018208061 | A1 | 11/2018 |
| WO | 2021201857 | A1 | 10/2021 |
| WO | 2022150538 | A1 | 7/2022 |

OTHER PUBLICATIONS

Anonymous, Study on system enhancement for Proximity based Services (ProSe) in the 5G System (5GS), 3rd Generation Partnership Project (3GPP), Technical Specification Group Services and System Aspects, Document: TR 23.752 V0.3.0, Release 17, Jan. 2020, 73 pages.

Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).

Third Generation Partnership Project, "Technical Specification Group Services and System Aspects; Study on security aspects of 3GPP support for advanced Vehicle-to-Everything (V2X) services (Release 16)," 3GPP TR 33.836 V16.1.0 (Sep. 2020).

Qualcomm Inc., et al. "V2X privacy over PC5," 3GPP TSG-CT WG1 Meeting #101bis, C1-170340, Spokane, USA (Jan. 16-20, 2017).

Qualcomm Inc.: "Security establishment procedures for Prose one-to-one communication", 3GPP Tdoc C1-161418 3GPP TSG-CT WG1 Meeting #96, Jeju (Korea), Feb. 15-19, 2016, 37 pages.

Interdigital: "TR 33.836 solution #4 update", 3GPP Draft; S3-193307—TR 33.836 Solution 4 Update, 3rd Generation Partnership Project (3GPP), Mobile Competence Centre ; 650, Route Des Lucioles ; F-06921 Sophia-Antipolis Cedex ; France vol. SA WG3, No. Chongqing, CN; Oct. 14, 2019-Oct. 18, 2019 Oct. 6, 2019 (Oct. 6, 2019), XP051810669.

LG Electronics, "Clarification of ID change for V2X PC5 conmunication" 3GPP TSG SA WG3 (Security) Meeting #87, S3-171109, Ljubljana, Slovenia (May 15-19, 2017).

Anonymous, "New SID: Study on architecture enhancements for 3GPP support of advanced V2X services—Phase 2", 3rd Generation Partnership Project (3GPP), Document: SP-190631, 3GPP SA2 Meeting #134, Sapporo, Japan, Jun. 24, 2019, 4 pages.

* cited by examiner

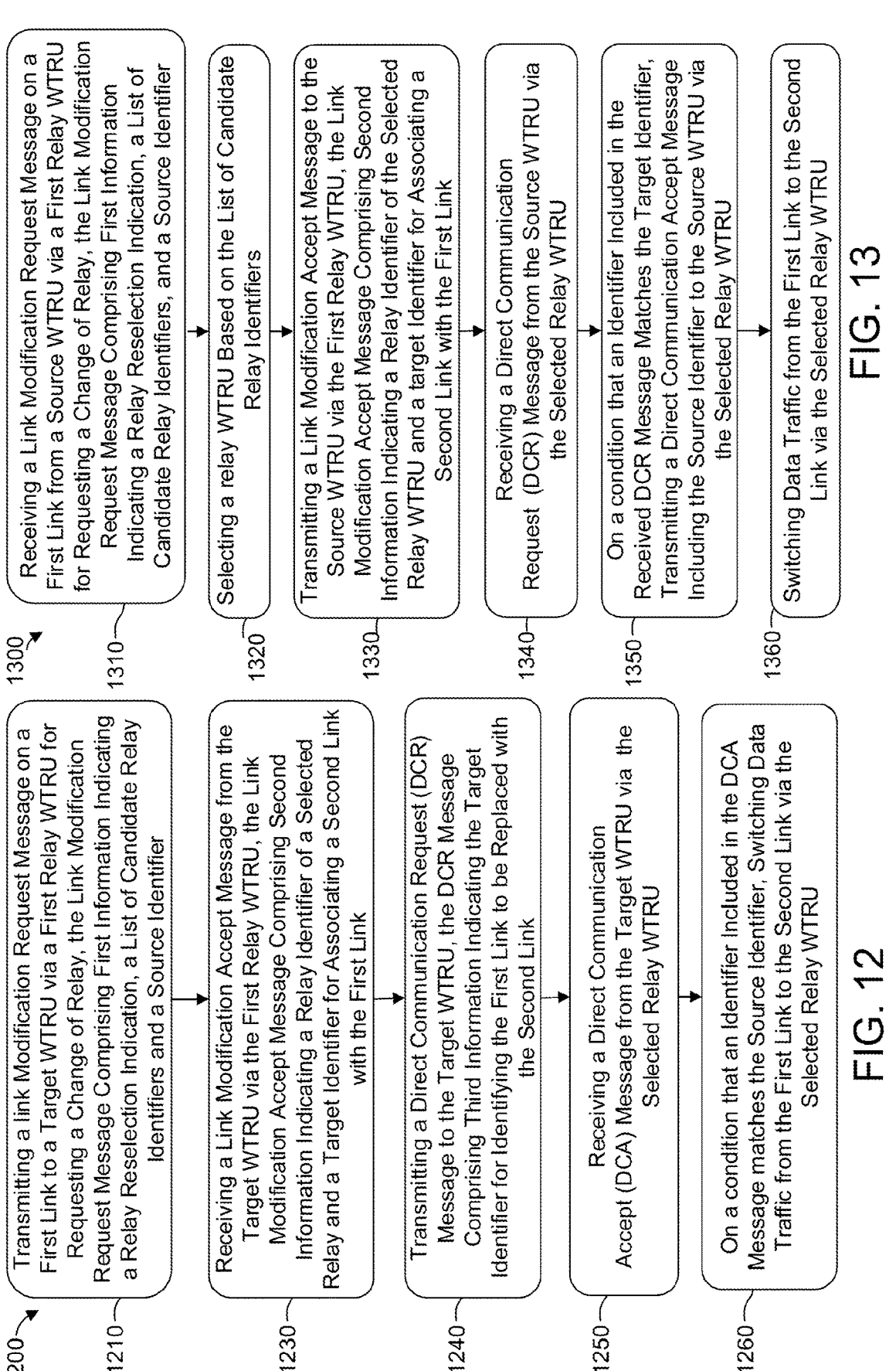

1300

1310 — Receiving a Link Modification Request Message on a First Link from a Source WTRU via a First Relay WTRU for Requesting a Change of Relay, the Link Modification Request Message Comprising First Information Indicating a Relay Reselection Indication, a List of Candidate Relay Identifiers, and a Source Identifier 1320 — Selecting a relay WTRU Based on the List of Candidate Relay Identifiers 1330 — Transmitting a Link Modification Accept Message to the Source WTRU via the First Relay WTRU, the Link Modification Accept Message Comprising Second Information Indicating a Relay Identifier of the Selected Relay WTRU and a Target Identifier for Associating a Second Link with the First Link 1340 — Receiving a Direct Communication Request (DCR) Message from the Source WTRU via the Selected Relay WTRU 1350 — On a condition that an Identifier Included in the Received DCR Message Matches the Target Identifier, Transmitting a Direct Communication Accept Message Including the Source Identifier to the Source WTRU via the Selected Relay WTRU 1360 — Switching Data Traffic from the First Link to the Second Link via the Selected Relay WTRU

1210 — Transmitting a link Modification Request Message on a First Link to a Target WTRU via a First Relay WTRU for Requesting a Change of Relay, the Link Modification Request Message Comprising First Information Indicating a Relay Reselection Indication, a List of Candidate Relay Identifiers and a Source Identifier 1230 — Receiving a Link Modification Accept Message from the Target WTRU via the First Relay WTRU, the Link Modification Accept Message Comprising Second Information Indicating a Relay Identifier of a Selected Relay and a Target Identifier for Associating a Second Link with the First Link 1240 — Transmitting a Direct Communication Request (DCR) Message to the Target WTRU, the DCR Message Comprising Third Information Indicating the Target Identifier for Identifying the First Link to be Replaced with the Second Link 1250 — Receiving a Direct Communication Accept (DCA) Message from the Target WTRU via the Selected Relay WTRU 1260 — On a condition that an Identifier Included in the DCA Message matches the Source Identifier, Switching Data Traffic from the First Link to the Second Link via the Selected Relay WTRU

FIG. 12

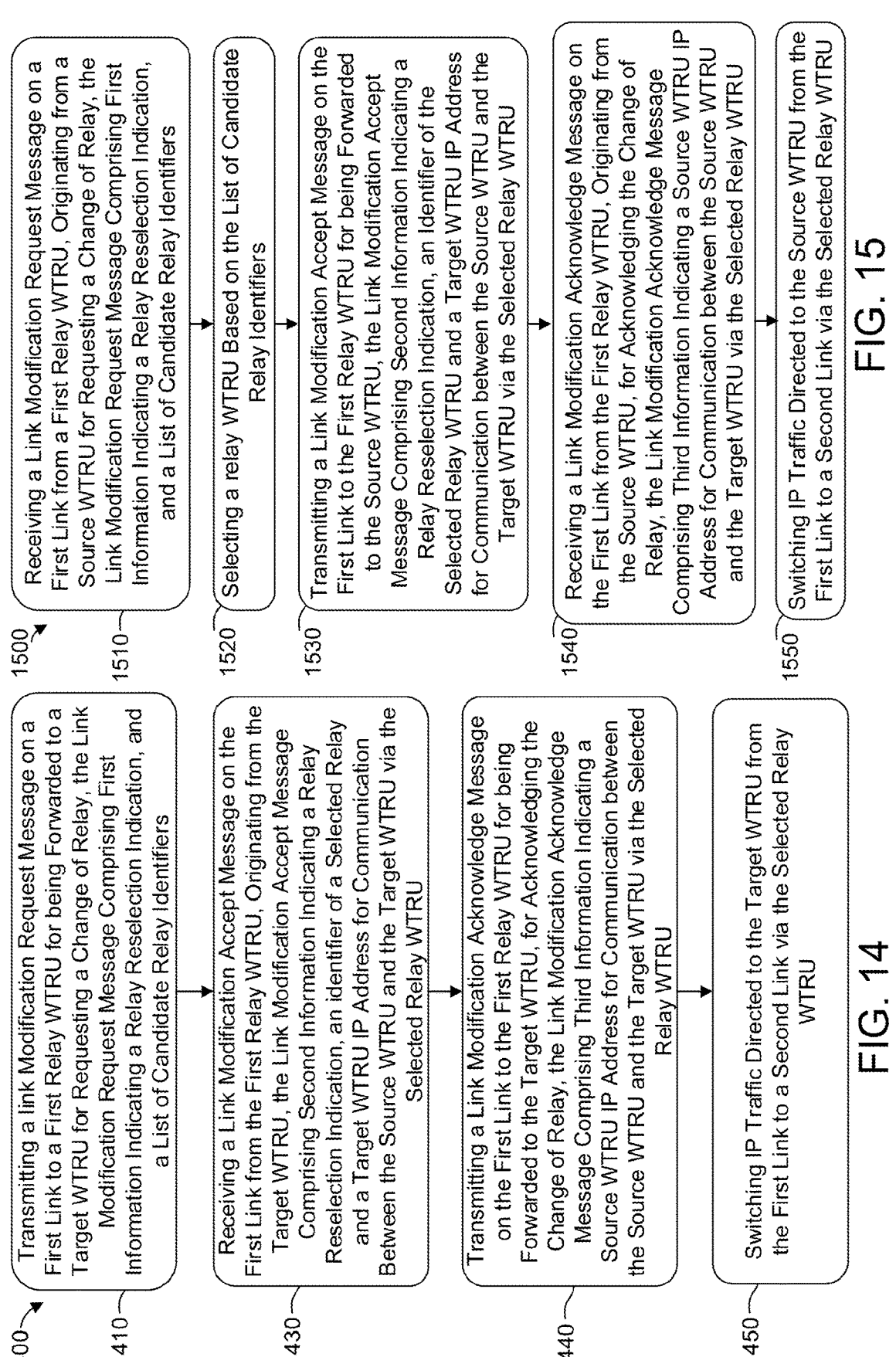

1500

1510 Receiving a Link Modification Request Message on a First Link from a First Relay WTRU, Originating from a Source WTRU for Requesting a Change of Relay, the Link Modification Request Message Comprising First Information Indicating a Relay Reselection Indication, and a List of Candidate Relay Identifiers 1520 Selecting a relay WTRU Based on the List of Candidate Relay Identifiers 1530 Transmitting a Link Modification Accept Message on the First Link to the First Relay WTRU for being Forwarded to the Source WTRU, the Link Modification Accept Message Comprising Second Information Indicating a Relay Reselection Indication, an Identifier of the Selected Relay WTRU and a Target WTRU IP Address for Communication between the Source WTRU and the Target WTRU via the Selected Relay WTRU 1540 Receiving a Link Modification Acknowledge Message on the First Link from the First Relay WTRU, Originating from the Source WTRU, for Acknowledging the Change of Relay, the Link Modification Acknowledge Message Comprising Third Information Indicating a Source WTRU IP Address for Communication between the Source WTRU and the Target WTRU via the Selected Relay WTRU 1550 Switching IP Traffic Directed to the Source WTRU from the First Link to a Second Link via the Selected Relay WTRU

1410 Transmitting a link Modification Request Message on a First Link to a First Relay WTRU for being Forwarded to a Target WTRU for Requesting a Change of Relay, the Link Modification Request Message Comprising First Information Indicating a Relay Reselection Indication, and a List of Candidate Relay Identifiers 1430 Receiving a Link Modification Accept Message on the First Link from the First Relay WTRU, Originating from the Target WTRU, the Link Modification Accept Message Comprising Second Information Indicating a Relay Reselection Indication, an identifier of a Selected Relay and a Target WTRU IP Address for Communication Between the Source WTRU and the Target WTRU via the Selected Relay WTRU 1440 Transmitting a Link Modification Acknowledge Message on the First Link to the First Relay WTRU for being Forwarded to the Target WTRU, for Acknowledging the Change of Relay, the Link Modification Acknowledge Message Comprising Third Information Indicating a Source WTRU IP Address for Communication between the Source WTRU and the Target WTRU via the Selected Relay WTRU 1450 Switching IP Traffic Directed to the Target WTRU from the First Link to a Second Link via the Selected Relay WTRU

FIG. 14

METHODS, APPARATUSES AND SYSTEMS DIRECTED TO A CHANGE OF WTRU TO WTRU RELAY

CROSS REFERENCE TO RELATED APPLICATIONS

This application is a U.S. National Stage Application under 35 U.S.C. 371 of International Patent Application No. PCT/US2021/025989, filed Apr. 6, 2021, which is incorporated here o by reference in its entirety.

This application claims the benefit of U.S. Provisional Patent Application No. 63/007,008, filed Apr. 8, 2020, which is incorporated herein by reference.

BACKGROUND

The present disclosure relates to network communications, including, but not exclusively, to methods, apparatuses, systems, etc. directed to relaying between wireless transmit/receive units (WTRUs). Two WTRUs that may not be able to directly communicate may use a relay WTRU to communicate. The relay WTRU may relay data between both WTRUs, enabling them to communicate.

SUMMARY

Methods, apparatuses, systems, etc., directed to perform a change of relay are disclosed herein. In an embodiment, a WTRU may transmit a link modification request message to a target WTRU via a first relay WTRU for requesting a change of relay. The WTRU may receive a link modification accept message from the target WTRU via the first relay WTRU, indicating a second relay WTRU (e.g., identifier). The WTRU may transmit a direct communication request message including the second relay WTRU identifier for indicating to the target WTRU an acceptance (e.g., confirmation) of the second relay WTRU. The WTRU may receive a direct communication accept message from the target WTRU via the second relay WTRU, indicating the traffic may be relayed via the second relay WTRU.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 12 is a diagram illustrating another example of a method for changing of relay, in a source WTRU;

FIG. 13 is a diagram illustrating another example of a method for changing of relay, in a target WTRU;

FIG. 14 is a diagram illustrating another example of a method for changing of relay, in a source WTRU;

FIG. 15 is a diagram illustrating another example of a method for changing of relay, in a target WTRU.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
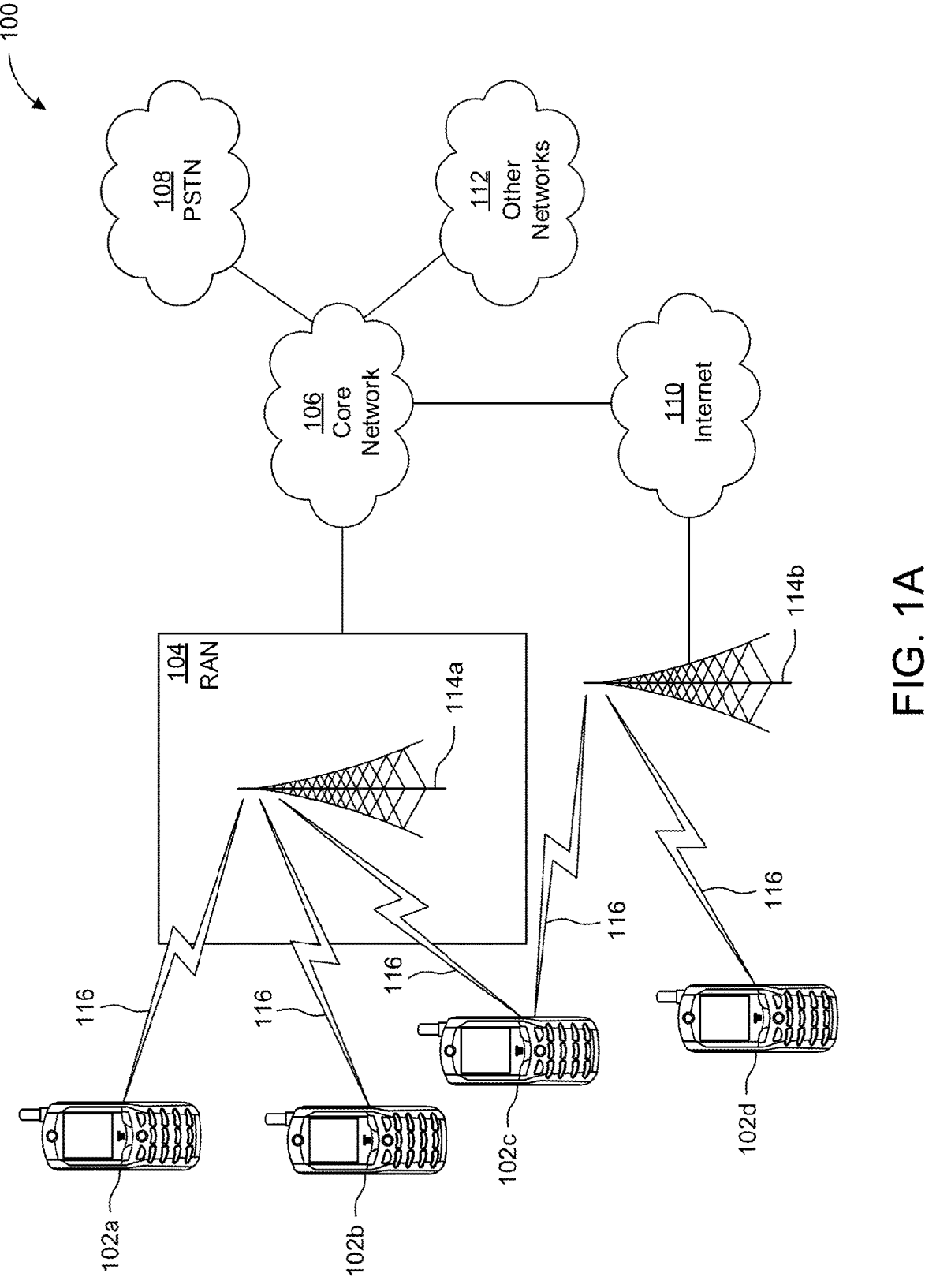
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, an NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
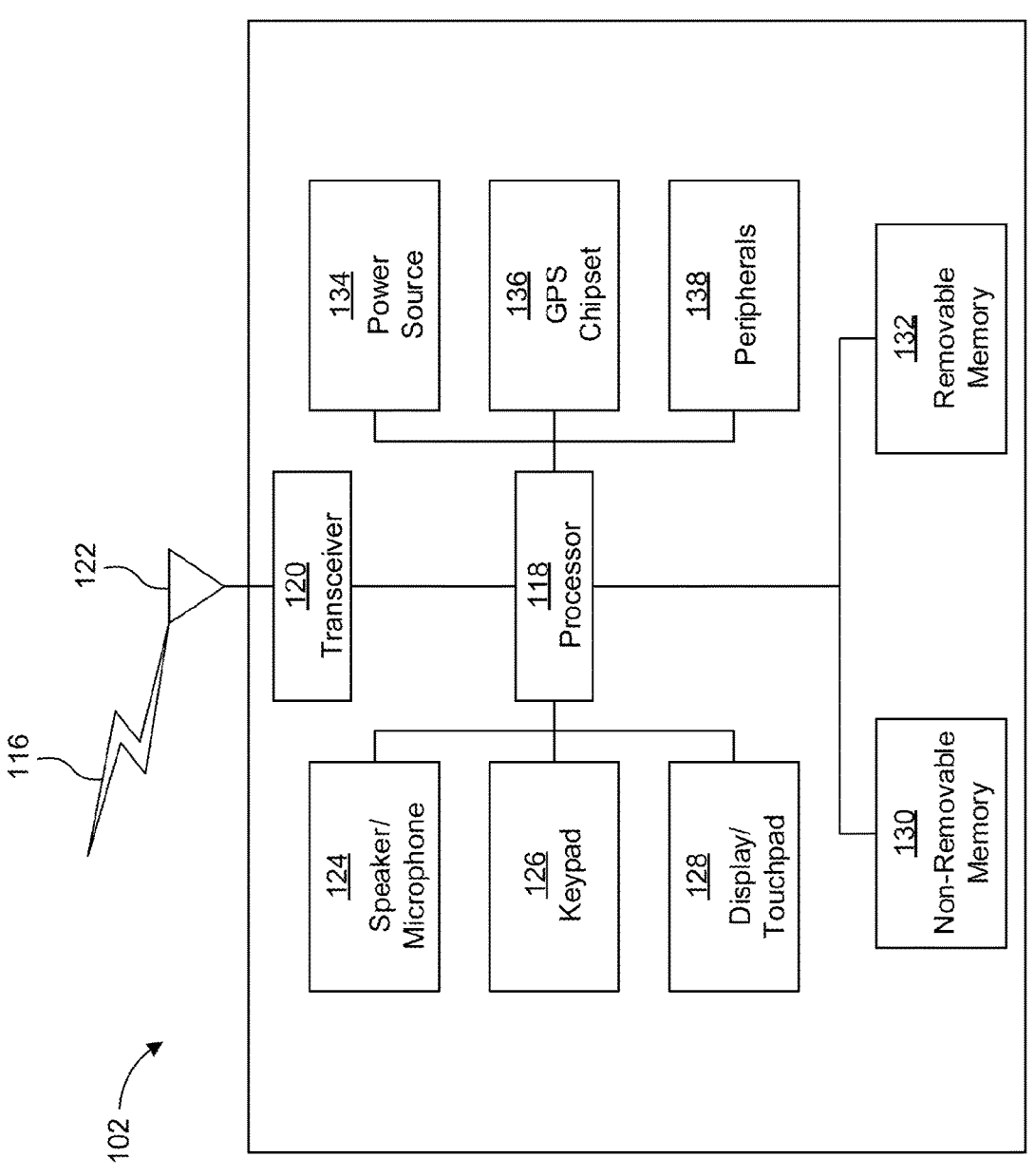
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
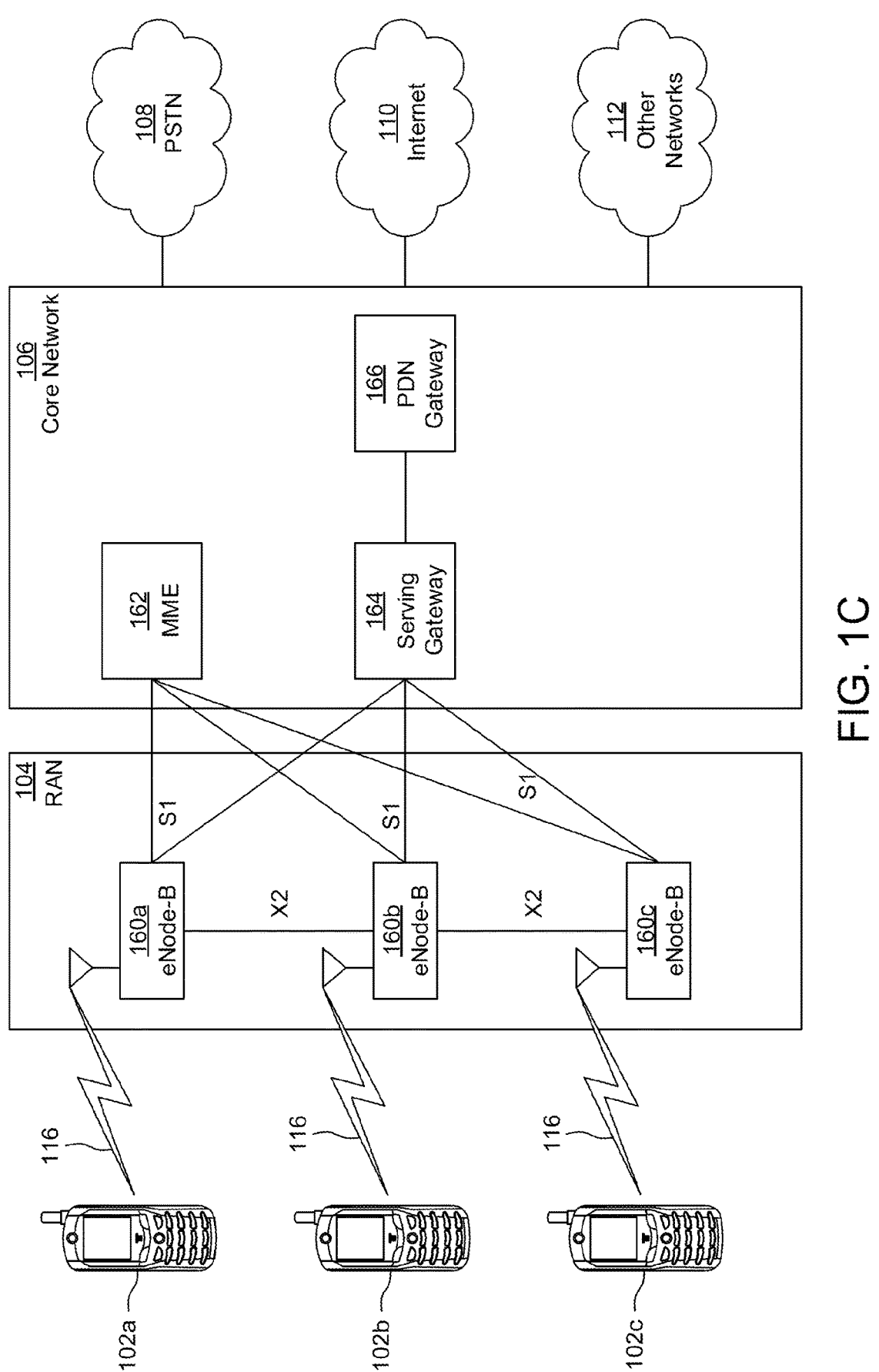
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
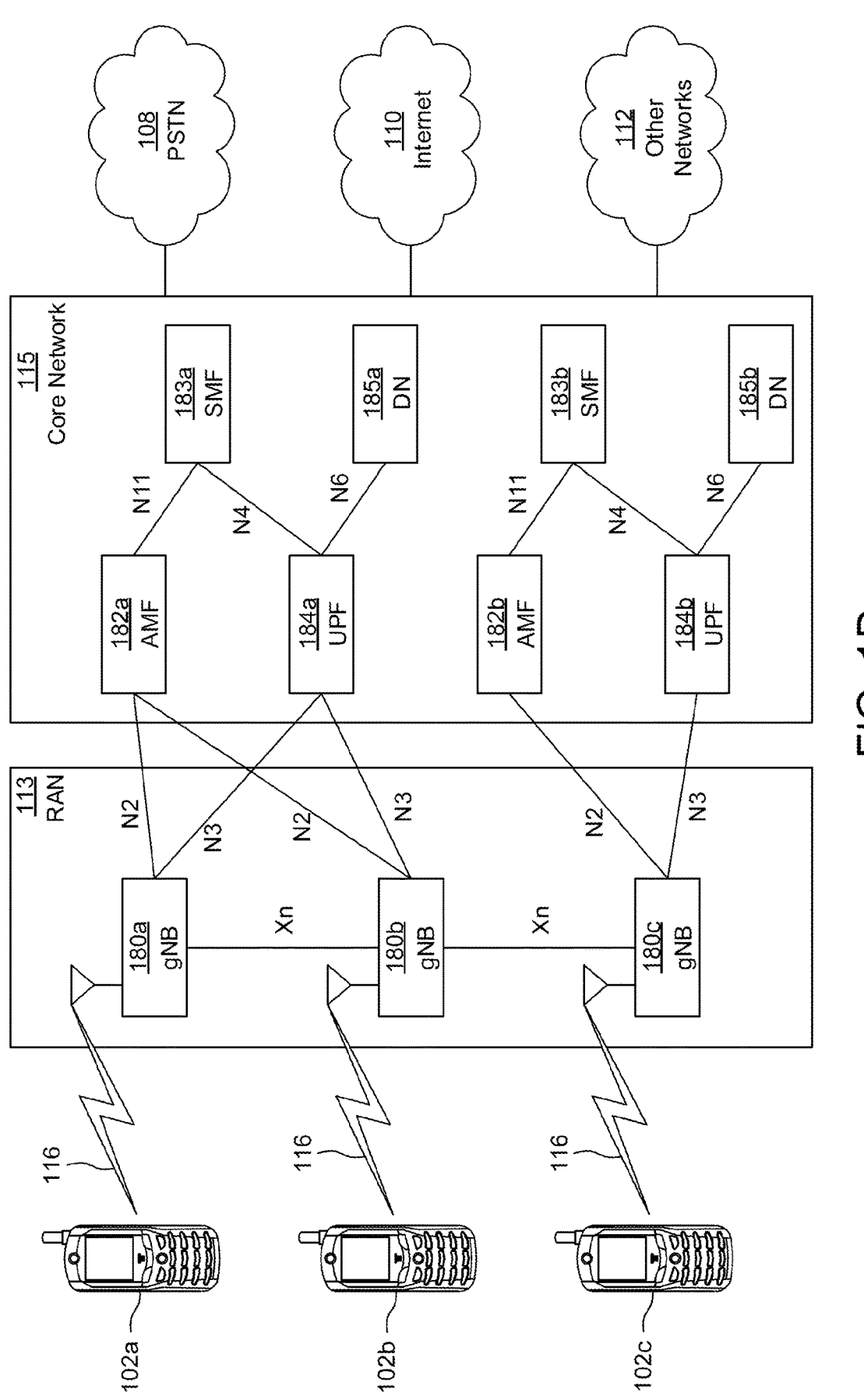
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In embodiments described herein, proximity-based services may be referred to as "ProSe". ProSe communication 5 (PC5) may represent a reference point (e.g., interface) between two WTRUs or any number of WTRUs. Any of control and user plane messages may be exchanged between WTRUs over the PC5 reference point (e.g., interface).

According to embodiments, a WTRU to WTRU relay may be a WTRU behaving as a relay between two peer WTRUs. A WTRU to WTRU relay may be configured to relay (e.g., forward) data from a source WTRU to a target WTRU.

In embodiments described herein, the terms "WTRU to WTRU relay", "R-WTRU", and "relay WTRU" may be used interchangeably.

In embodiments described herein, the terms "source WTRU", "S-WTRU", "initiating WTRU", "peer WTRU" "WTRU1" may be used interchangeably.

In embodiments described herein, the terms "target WTRU", "T-WTRU", "responding WTRU", "peer WTRU", "WTRU2", "WTRU3" and "WTRU4" may be used interchangeably.

In embodiments described herein, the term "user info" may refer to an application layer identifier. For example, a WTRU may be identified at the application layer based on this identifier. The user info may be used in direct communication (e.g., any of request and accept) messages to identify any of a source and a target WTRUs.

For communication over the PC5 reference point, any of an IP address and an IP prefix, (collectively IP address/prefix) may be used. An IP address may be any of an IPV4 and IPv6 address. A prefix may be an IPV6 prefix.

In embodiments described herein, the terms "layer-2" (L2) and layer-3 (L3) may refer to respectively the data link layer and the network layer of the Open Standard Interconnection (OSI) reference model.

Example of Layer-2 WTRU to WTRU Relay Method

Figure 2:
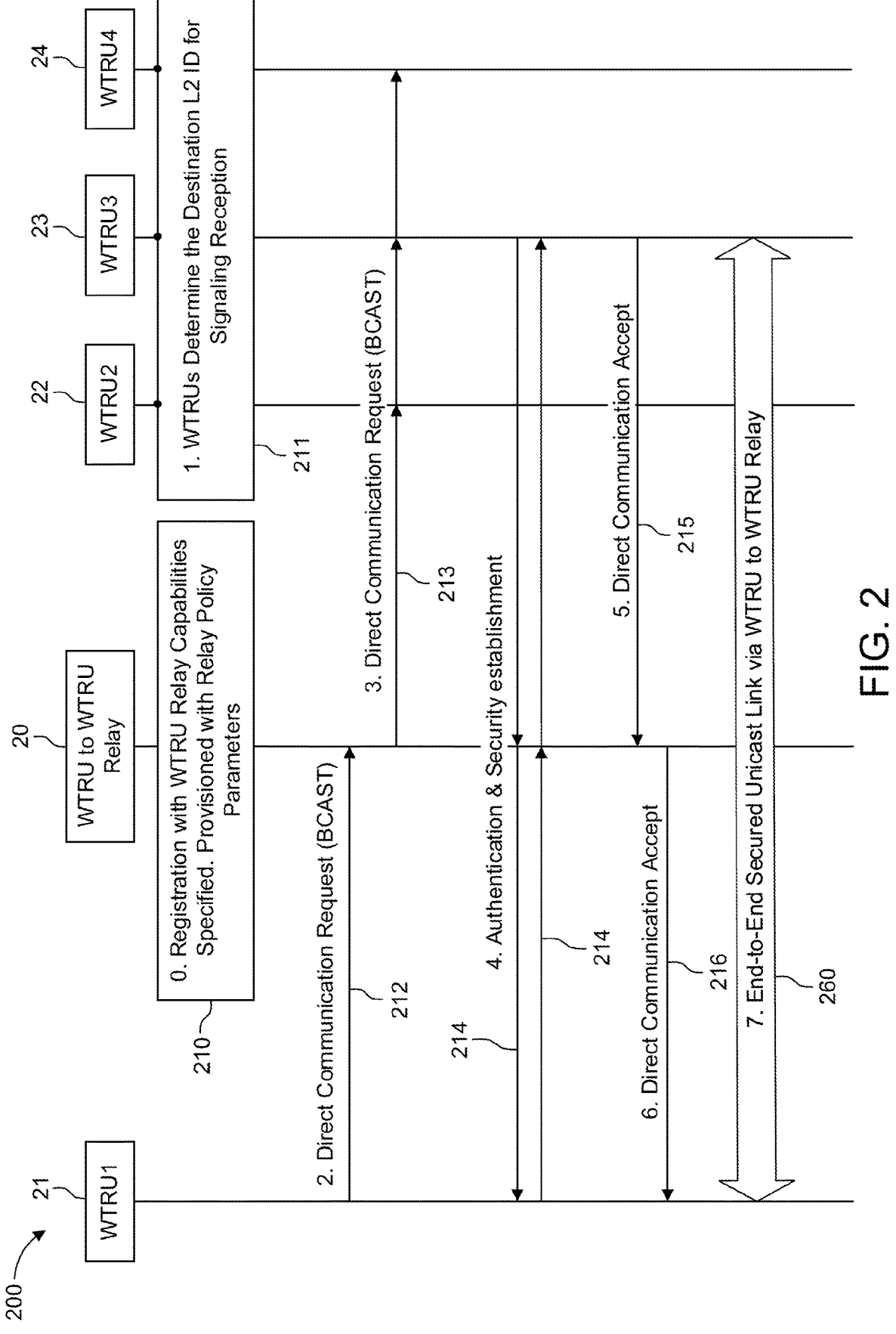
FIG. 2 a diagram illustrating an example of a layer-2 WTRU to WTRU relay method.

FIG. 2 is a diagram illustrating an example of a layer-2 WTRU to WTRU relay method 200. According to embodiments, in step 210, a relay WTRU 20 may be provisioned with relay policy parameters. In step 211, a target WTRU 22, 23, 24 may determine a destination layer-2 identifier (L2 ID) for signaling reception. A source WTRU 21 may send a direct communication request (DCR) message 212, for example, in broadcast mode to the relay WTRU 20, which may trigger a WTRU discovery process by sending a broadcast DCR message 213 to peer WTRUs 22, 23, 24. The relay WTRU 20 may receive the DCR message 212. The relay WTRU 20 may verify whether it is configured to relay this application. For example, the relay WTRU 20 may compare the ProSe application identifier with its provisioned relay policy/parameters. For example, the relay WTRU 20 may assign (e.g., itself) a relay layer-2 identifier (R-L2-ID) for the source WTRU 21 (e.g., related to the L2 ID of the source WTRU 21 (S-L2-ID). The R-L2-ID and the S-L2-ID may be saved, for example, in a local mapping table of the relay WTRU 20. The relay WTRU 20 may override (e.g., set) the source field of the message with its R-L2-ID and may include (e.g., add) its (e.g., unique) relay identifier (RID) as a relay indication.

According to embodiments, a target WTRU 23, may initiate (e.g., trigger) the authentication and security establishment 214 with the source WTRU 21 via the relay WTRU 20. After the security may be established, the target WTRU 23 may send a direct communication accept (DCA) message 215 to the relay WTRU 20, which may be forwarded 216 to the source WTRU 21.

According to embodiments, a (e.g., secured, end to end PC5 unicast) link 260 may be set up between the source WTRU 21 and the target WTRU 23 via the relay WTRU 20. For example, the source 21 and target 23 WTRUs may not know their respective peer WTRU L2 IDs. The source 21 and target 23 WTRUs may send messages to the relay WTRU 20 and may receive messages from the relay WTRU 20. According to embodiments, the security association and the (e.g., PC5 unicast) link may be established (e.g., directly) between the source WTRU 21 and the target WTRU 23. For example, the source 21 and target 23 WTRUs may detect that the communication may go through a relay WTRU based on detecting any of a relay indication and a relay identifier (RID) included in the received messages.

According to embodiments, the relay WTRU 20 may maintain a mapping table, for example, including the mapping of peer WTRU L2 IDs and the corresponding R-L2 IDs that may have been self-assigned. After receiving a message, the relay WTRU 20 may retrieve the source and destination identifiers (L2 IDs) to be used for forwarding the message to the target WTRU, based on the mapping table. The relay WTRU 20 may update the source and destination fields of the received message with the corresponding WTRU's L2 ID and R-L2 ID before forwarding the message. For example, the relay WTRU 20, receiving a message from the target WTRU 23, may use the R-L2-ID of the received message for retrieving the L2 ID of the source WTRU 21 based on the mapping table. The relay WTRU 20 may set the source field of the message to R-L2 ID and may set the destination field to the L2 ID of the source WTRU 21. The relay WTRU 20 may send the message to the source WTRU 21.

According to embodiments a (e.g., management) unicast link may be established between the WTRU 21, 23 (e.g., any of the source and target WTRU) and the relay WTRU 20. For example, the (e.g., management) unicast link may be used to manage other links such as, for example, links going through the relay WTRU 20 and associated with the same RID as the (e.g., management) unicast link. For example, the (e.g., management) unicast link may be secured (e.g. any of integrity and confidentiality protected) between any of the source 21, the target 23 and the relay 20 WTRUs.

Example of Layer-3 WTRU to WTRU Relay Method

Figure 3:
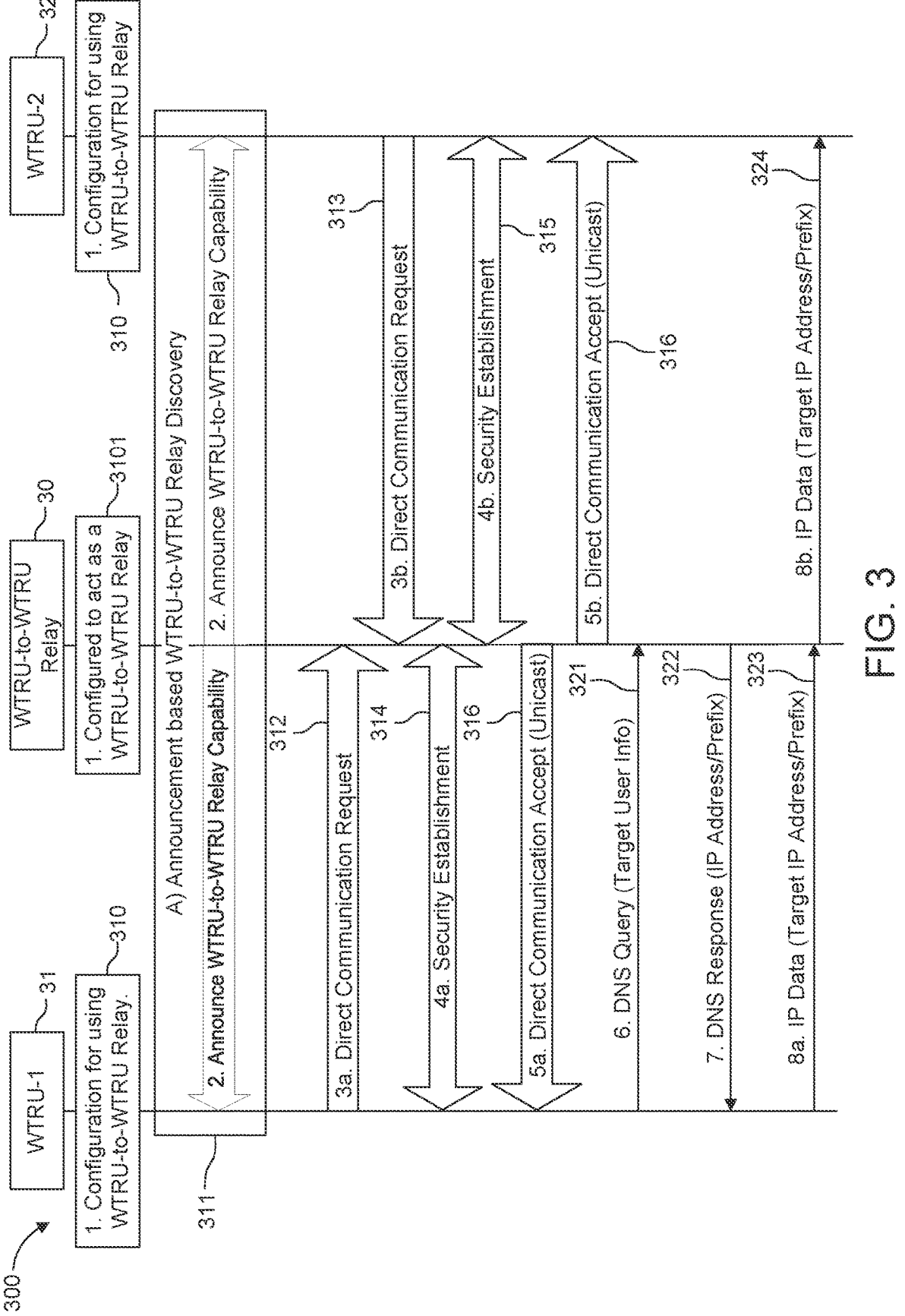
FIG. 3 is a diagram illustrating an example of a layer-3 WTRU to WTRU relay method.

FIG. 3 is a diagram illustrating an example of a layer-3 WTRU to WTRU relay method 300. According to embodiments, in step 310, a source 31 and a target 32 WTRUs may be configured to use WTRU to WTRU relay. In step 3101, a WTRU 30 may be configured to act as a relay WTRU. In step 311, the relay 30 WTRUs may announce relay capabilities, for example, based on WTRU to WTRU relay discovery. Relay advertisements (e.g., of relay capabilities) may be received by any of the source 31 and the target 32 WTRUs.

According to embodiments, any of the source WTRU 31 and the target WTRU 32 (e.g., intending to make use of ProSe WTRU to WTRU relay), may establish (e.g., respective PC5 unicast) links with the relay WTRU 30 as previously described. For example, any of steps and messages 312, 313, 314 315 and 316 of FIG. 3 respectively correspond to steps and messages 212, 213, 214 215 and 216 of FIG. 2.

According to embodiments, the relay WTRU 30 may allocate an IP address/prefix to any of the source WTRU 31 and the target WTRU 32, for example as part of the (e.g., PC5 unicast) link establishment procedure. The association of the user information (e.g., user info) of the WTRU 31, 32 and the allocated IP address/prefix may be stored into, for example, a domain name server (DNS) entry. The relay WTRU 30 may process, for example, a DNS Server.

According to embodiments, for communicating with a target WTRU 32, the source WTRU 31 may send a DNS query 321 for the target WTRU 32 to the relay WTRU 30 over the unicast link. For example, the DNS query 321 may include the target user info (e.g., user info of the target WTRU). According to embodiments, for discovering a ProSe service via the relay WTRU 30, the source WTRU 31 may send a DNS query 321 to the relay WTRU 30. For example, the DNS query 321 may include the ProSe service (e.g., an ProSe service type). The relay WTRU may respond to the DNS query with a DNS response 322 including the IP address/prefix of the target WTRU 32 (e.g., or of the ProSe Service).

According to embodiments, the source WTRU 31 may send (e.g., any of IP and non-IP) data 323, encapsulated in IP, to the target WTRU 32 via the (e.g., PC5 unicast) link to the relay WTRU 30 (e.g., that may have returned the IP address/prefix of the target WTRU 32). The relay WTRU 30 may act as an IP router (e.g., between the source WTRU 31 and the target WTRU 32). For example, the relay WTRU 30 may forward packets 324 to the corresponding (e.g., PC5 unicast) link towards the target WTRU 32. For example, a (e.g., each PC5 unicast) link may be treated as an IP interface.

According to embodiments, a WTRU may be in proximity of multiple (e.g., any number of) relay WTRUs. For example, the WTRU may select a relay WTRU among any relay WTRUs in proximity, according to any criteria. For example, a (e.g., PC5 unicast) link may be established with the selected relay WTRU. For example, the WTRU may send a DNS query for a target WTRU to any number of relay candidates and select as relay WTRU for the target WTRU the relay candidate that was first to return a positive response to the DNS query for the target WTRU. In another example, the relay WTRU may be selected among relay candidates for the target WTRU based on received signal levels (e.g., any of a highest signal level and a signal level higher than a value).

Example of End to End PC5 Unicast Link Method

Figure 4:
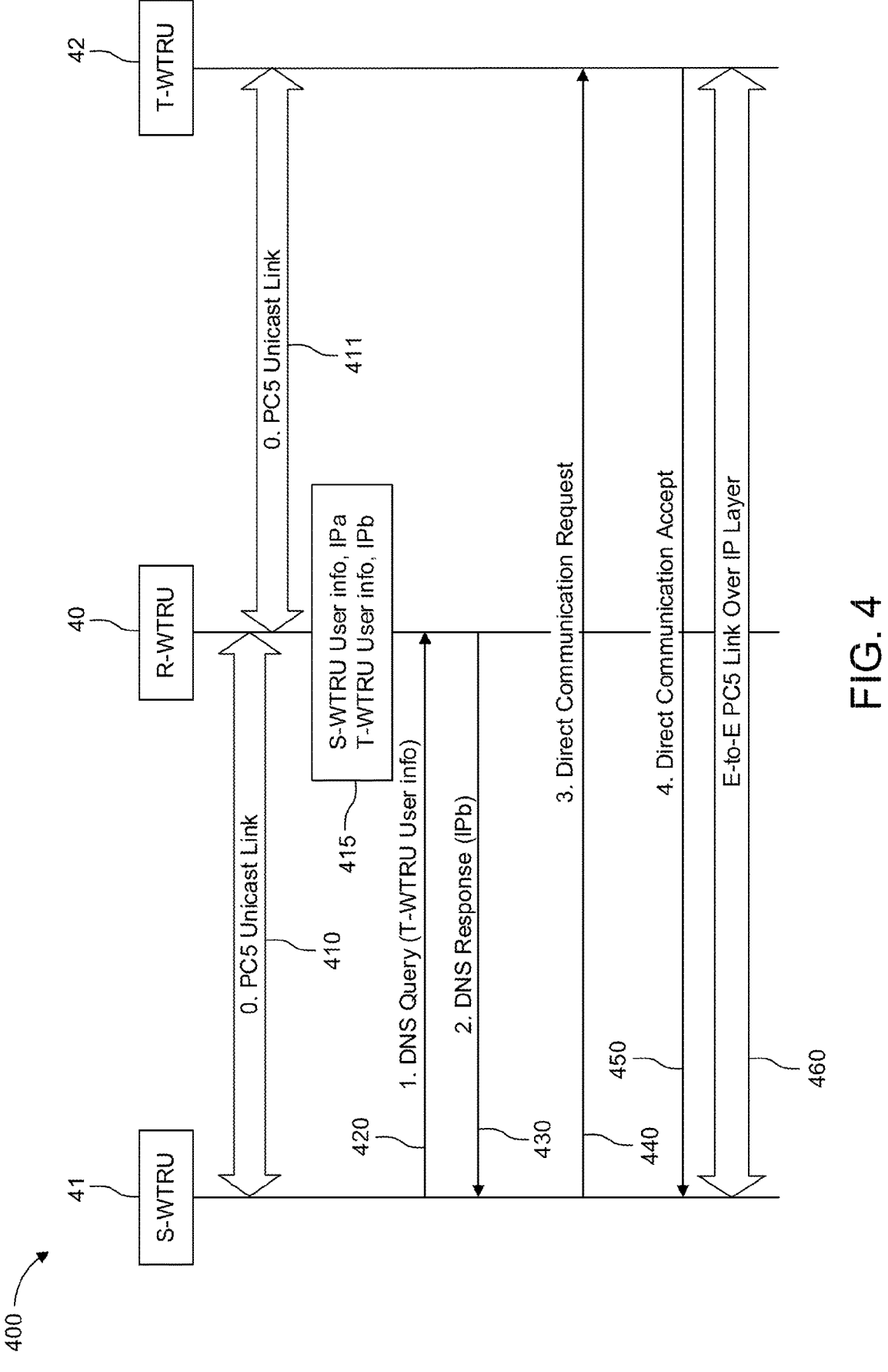
FIG. 4 is a diagram illustrating an example of an end to end PC5 unicast link method.

FIG. 4 a diagram illustrating an example of an end to end PC5 unicast link method 400. According to embodiments, a first PC5 unicast link 410 may be established between a source WTRU 41 and a relay WTRU 40. According to embodiments, a second PC5 unicast link 411 may be establish between a target WTRU 41 and the relay WTRU 40. According to embodiments, in step 415, the user info of the source WTRU 41 may be associated with a first IP address/prefix. The user info of the target WTRU 42 may be associated with a second IP address/prefix. According to embodiments, the source WTRU 41 may send a DNS query 420 to the relay WTRU 40, including the user info of the target WTRU 42. The relay WTRU 40 may send a DNS response 430 to the source WTRU 41, including the second IP address/prefix (e.g., associated with the target WTRU user info). According to embodiments, the source WTRU 41 may send a DCR message 440 to the target WTRU 42. According to embodiments, the target WTRU 42 may send a DCA message 450 to the source WTRU 41.

According to embodiments an end to end (E-to-E) PC5 unicast link 460 may be established between the source WTRU 41 and the target WTRU 42 over the IP layer. For example, (e.g., all) E-to-E unicast link packets transmitted between the source WTRU 41 and the target WTRU 42 may be encapsulated into IP packets (e.g., using any of the first and the second IP address/prefix as source/destination IP addresses), and may be forwarded (e.g., routed) by the relay WTRU 40.

Embodiments described herein may allow a source WTRU to reselect (e.g., select another, different) relay WTRU in proximity of the source WTRU. For example, a source WTRU and a target WTRU may communicate via a first relay WTRU (e.g. Relay #1). For example, the source WTRU may move away from Relay #1 and may discover that other relay WTRUs (e.g. Relay #2 and Relay #3), may be better candidates than Relay #1. For example, any of Relay #2 and Relay #3 may provide stronger signal, and may be available (e.g., for performing WTRU to WTRU relay). Embodiments described herein may allow the source WTRU to select another Relay (e.g. any of Relay #2 and Relay #3) to continue its communication with the target WTRU.

Embodiments described herein may allow to provide a mechanism for path changing in case of e.g. relay WTRU changes. For example, embodiments described herein may allow a source WTRU to setup communication via a new relay WTRU (e.g. Relay #2), to switch the data traffic and to maintain service continuity via this new relay WTRU to continue the communication with the target WTRU (e.g., continue without interruption).

Embodiments described herein may allow to handle WTRU to WTRU relay reselection (e.g., by the WTRU) and path switching in an efficient and secured way. Embodiments described herein may allow to reduce (e.g., minimize) signaling in general, and signaling for security in particular, for WTRU to WTRU relay reselection (e.g., by the WTRU) and path switching.

According to embodiments, for layer-2 WTRU to WTRU relay methods, a source and a target WTRUs may establish a security context based on a root key (which may be referred to herein as KD), and a session key (which may be referred to herein as KD-session). For example, KD may be generated from the mutual authentication of the source and the target WTRUs, and KD-session may be derived from KD. For example, the identifier of KD-session (KD-session ID) may serve as the identifier of the security context. Any of integrity and confidentiality keys may be derived, for example, from KD-session.

According to embodiments, a L2 WTRU to WTRU relay change may be triggered by the source WTRU. For example, the source WTRU may send a link modification request message to the target WTRU (e.g., via the current relay WTRU). The current relay WTRU may be referred to herein as RID1. The link modification request message may include any of a relay reselection indication, a list of potential relay identifiers (RIDs), a security establishment method and a (e.g., first) token (which may be referred to herein as TokenA). The link modification request message may include security parameters, such as, for example, any of nonce1 (e.g., arbitrary number to be used once for cryptographic purposes), an identifier of a root key (e.g., any of KD ID, most significant bits of new KD-session identifier). According to embodiments, the session establishment method may be set to any of (1) "in advance", (2) "re-use same security context", and (3) "on link establishment". Security parameters may be included in the link request modification message for "in advance" and "re-use same security context" session establishment methods. No security parameters may be included in the link request modification message for the "on link establishment" session establishment method. According to embodiments, TokenA may be (e.g., any of integrity and confidentiality) protected using, for example, current security context (e.g., used in communications via the current relay WTRU).

According to embodiments, the target WTRU may select a new relay (e.g., RID2) from the list of potential RIDs. The target WTRU may, for example, self-assign (e.g., in advance) a new L2 ID. In a case where the security establishment method may be set to "in advance", the target WTRU may establish the security context in advance (e.g., derive security keys) for being used via the new relay WTRU (e.g., RID2) later. For example, a new KD-session may be derived from the root key KD, nonce1 and a nonce2, for example, generated by the target WTRU.

According to embodiments, the target WTRU may send a link modification accept message, for example including any of a selected RID, a derived (e.g., new) L2 ID, the accepted security establishment method and TokenB. Security parameters may, for example, be included in the link modification accept message (e.g., any of nonce2, LSB of new KD-session identifier). According to embodiments, TokenB may be (e.g., any of integrity and confidentiality) protected using, for example, the current security context.

According to embodiments, the target WTRU may monitor its new L2 ID for the reception of messages.

According to embodiments, the source WTRU may establish the security context in advance (e.g., derive security keys) for being used via the new relay WTRU (RID2) (e.g., derive KD-session similarly to the target WTRU).

According to embodiments, the source WTRU may send a (e.g., broadcast) DCR message indicating any of the new relay WTRU identifier (RID2), a new L2 ID of the target WTRU, and TokenB. According to embodiments TokenB may be (e.g., any of integrity and confidentiality) protected using any of the new established security context and the current security context.

According to embodiments, the new relay WTRU (RID2) may receive (e.g., broadcast) DCRs. For example, the new relay WTRU, may check whether the DCR destination may be set to RID2. The new relay WTRU may extract the target WTRU's L2 ID from the DCR and may set the destination field of a DCR message to the target WTRU's L2 ID. The new relay WTRU may send the (e.g., unicast) DCR message to the target WTRU.

According to embodiments, the target WTRU may use TokenB to associate the new unicast link being established (e.g., via RID2) with the (e.g., other, current) unicast link (e.g., via RID1). Establishing the security context in advance may allow the target WTRU to skip the security establishment procedure and to (e.g., directly) send a DCA message to the source WTRU e.g., including TokenA. The message may be protected, for example, using the security context, that may have been previously derived in advance.

According to embodiments, the source WTRU may use TokenA to associate the new unicast link being established (e.g., via RID2) with the (e.g., other, current) unicast link (e.g., via RID1). According to embodiments, the source WTRU may switch the traffic (e.g., from the current unicast link) to the new unicast link (e.g., via RID2).

According to embodiments, a L2 WTRU to WTRU relay change may be triggered by the relay WTRU. According to embodiments, the relay WTRU may send a link modification request message to the source WTRU, indicating, for example, that a new relay WTRU may be selected and traffic may be switched to a new connection. The relay WTRU may send this information, for example, on the management link established with the source WTRU. The relay WTRU may indicate to which other (e.g., PC5 unicast) link the relay change may apply (e.g., toward which target WTRU). For example, the link modification request message may include an "other link" indication, the L2 IDs may identify the (e.g., PC5 unicast) link to be switched. For example, the link modification request message may (e.g. also) include the replacing RID.

According to embodiments, the source WTRU may trigger the change of relay by using the method described above (e.g., for the change triggered by the target WTRU). According to embodiments, the source WTRU may indicate the replacing RID to the target WTRU.

According to embodiments, a L2 WTRU to WTRU relay change method may include an exchange of link identifier (ID). According to embodiments, a link ID may be associated with a unicast link, for example, during the link establishment.

For example, a WTRU to WTRU relay change may be triggered. The source WTRU may send a (e.g., broadcast) DCR message to establish a new link via a new relay WTRU. The source WTRU may include the Link ID associated with the link via the relay WTRU to be changed and the target WTRU's ID.

According to embodiments, the relay WTRU may forward the DCR to the target WTRU, including the link ID.

According to embodiments, the target WTRU may receive the DCR message and may locate (e.g., identify) the previous unicast link to be replaced based on the link ID.

According to embodiments, the target WTRU may respond with (e.g., transmit) a DCA message.

According to embodiments, PC5 signaling may be relayed between the source and the target WTRUs. For example, the source WTRU may send a link modification request to the current relay WTRU (e.g., RID1). The source WTRU may indicate that the message may be for "relay reselection" and destined to the target WTRU.

According to embodiments, the current relay WTRU (e.g., RID1) may forward the link modification request message to the target WTRU based on at the "relay reselection" indication.

According to embodiments, the target WTRU may send a link modification accept message including, for example, the selected relay WTRU (e.g., RID2) and the IP address/prefix of the target WTRU to be used with RID2.

According to embodiments, the current relay WTRU (e.g., RID1) may forward the link modification accept message to the source WTRU based on the "relay reselection" indication.

According to embodiments, the source WTRU may send a new link modification ack message (e.g., destined) to the target WTRU, for example, including the IP address/prefix of the source WTRU to be used with RID2 with the "relay reselection" indication.

According to embodiments, the current relay WTRU (e.g., RID1) may forward the new link modification ack message to the target WTRU based on the "relay reselection" indication.

According to embodiments, the traffic may be moved to RID2. The source and target WTRUs may use the IP addresses/prefixes exchanged via the link modification messages. According to embodiments the (e.g., PC5 unicast)

links may be established between the source/target WTRUs and the new relay WTRU (RID2) without any DNS query for discovering the peer WTRU (e.g., possibly via many relays).

According to embodiments, a Layer-3 WTRU to WTRU relay change method may be based on an (e.g., E-to-E PC5 unicast) link over the user plane.

For example, the source WTRU may send a link modification request message to the target WTRU (e.g., via RID1) including any of a "relay reselection" indication and a list of (e.g., identifiers of) candidate relays (RIDs).

According to embodiments, the target WTRU may select a new relay WTRU (RID2), for example, from the list of RIDs. The target WTRU may send a link modification accept message including the selected RID, and the IP address/prefix of the target WTRU to be used with the selected RID.

According to embodiments, the source WTRU may send a new link modification ack message including the IP address/prefix of the source WTRU to be used with the selected RID.

According to embodiments, the source/target WTRUs may establish a (e.g., PC5 unicast) link over the user plane, via RID2 and may switch traffic from previous link via RID1 to the new link via RID2, using the IP addresses/prefixes exchanged via the link modification messages. According to embodiments, the source/target WTRUs may change of relay WTRU without any DNS query to discover the peer WTRU (e.g., possibly via many relays).

According to embodiments, a Layer-3 WTRU to WTRU relay change method may be based on a message exchange via the user plane. For example, any of a source and a target WTRU may exchange user plane messages (e.g., application specific) to trigger a change of relay.

Figure 5:
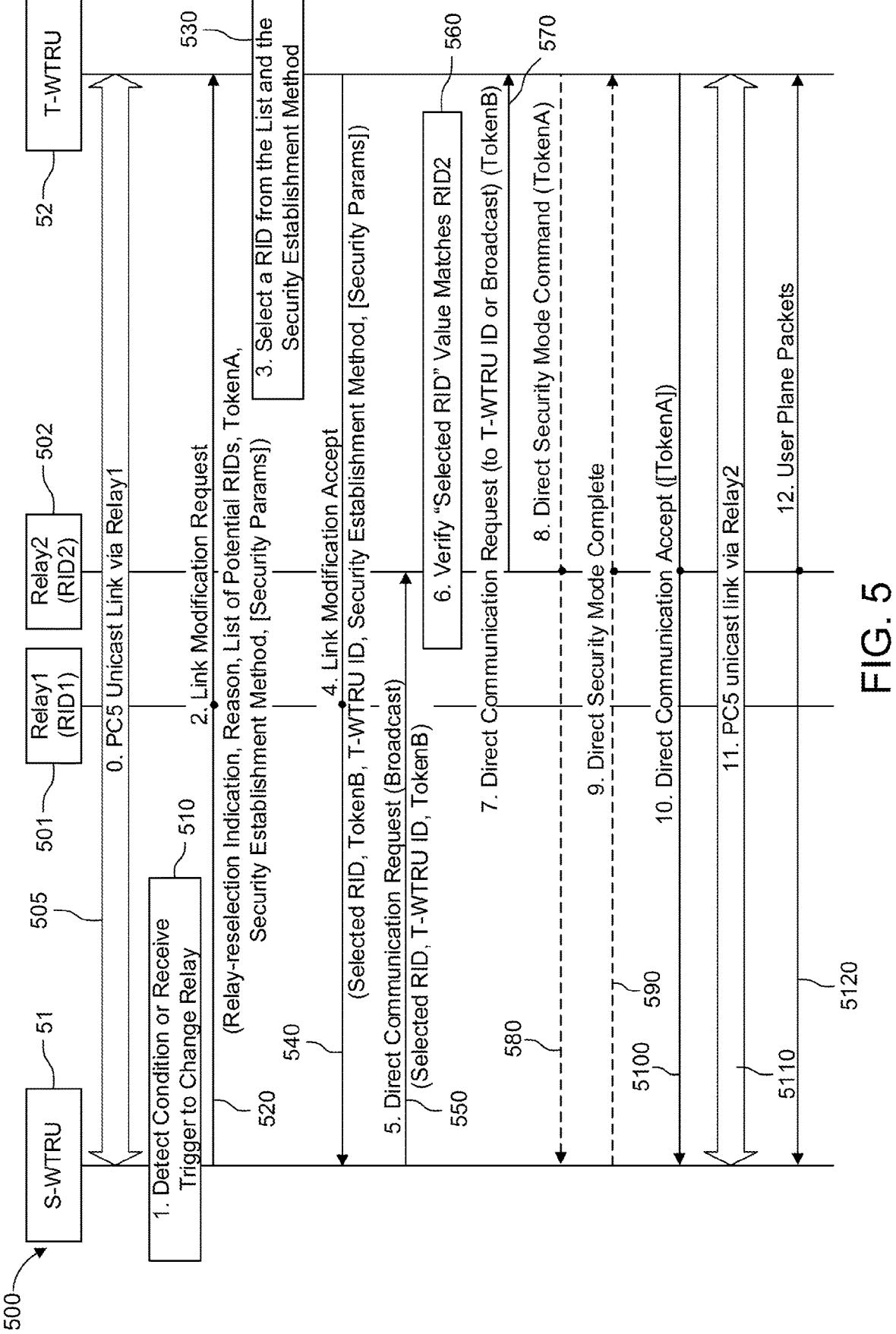
FIG. 5 is a diagram illustrating an example of a method for changing of layer-2 WTRU to WTRU relay, triggered by the source WTRU.

Example of a Method for Changing of Layer-2 WTRU to WTRU Relay Triggered by the Source WTRU FIG. 5 is a diagram illustrating an example of a layer-2 method 500 for changing of layer-2 WTRU to WTRU relay, triggered by the source WTRU. A (e.g., PC5 end to end unicast) link 505 may have been established between a source WTRU 51 and a target WTRU 52 via a first relay WTRU 501, according to any embodiment described herein. For example, the link 505 between the source WTRU 51 and the target WTRU 52 via the first relay WTRU 501 may be referred to herein as a first link. Any of the source and target WTRUs may send and/or receive messages (e.g., packets) to/from the first relay WTRU 501, configured to process a layer-2 WTRU to WTRU relay method. For example, the first relay WTRU may forward messages based on layer-2 addressing.

In step 510, the source WTRU 51 may be instructed to change of relay according to a criterion. For example, the WTRU may detect a condition for changing of relay. For example, the condition may be based on a (e.g., low) signal level received from the first relay WTRU 501. For example, the change of relay may be triggered based on a decrease of the signal level. In another example, the change of relay may be triggered on condition that the signal level is below a (e.g., threshold) value. More generally, the condition may be based on any metric representative of the link quality with the first relay WTRU (e.g., QoS, latency, packet loss, . . . ), and may indicate a decrease of the link quality. In another example, the trigger for changing of relay may be received (e.g., from the first relay WTRU 501). According to embodiments, the source WTRU 51 may perform a discovery procedure to obtain (e.g., a list of) relay WTRU candidates. A relay WTRU candidate may be any WTRU in the neighborhood of the source WTRU 51, capable of WTRU to WTRU relaying. For example, a relay WTRU candidate may be identified by a relay identifier (RID).

According to embodiments, the source WTRU 51 may send a link modification request message 520 to the target WTRU 52, via the first relay WTRU 501, e.g., on the first link. According to embodiments, the link modification request message 520 may include (e.g., first information indicating) any of a relay reselection indication (e.g., indicating a request for changing of relay), a reselection reason (e.g., any of QoS not met, low signal, relay maintenance), a list of identifiers of candidate relays (RIDs) and a source identifier such as e.g., a token (which may be referred to herein as TokenA). TokenA may be any kind of identifier that may be used for associating the first link with a replacing (e.g., second) link in any of the source and the target WTRUs. For example, TokenA may be a source (e.g., link) identifier. According to embodiments, the link modification request message 520 may include any number of (e.g., proposed) security establishment methods, and their parameters. For example, the parameters may include security parameters for the establishment of security (e.g. a list of supported security algorithms). In another example, the parameters may include security parameters for re-use of existing security context (e.g. a contextual count value).

According to embodiments, the link modification request message 520 may include an information indicating a security establishment method, which may be set to a value, for example, indicating any of "in advance", "re-use the same" and "on link establishment". According to embodiments, "in advance" may indicate that the security may be established during the link modification process (e.g., before the link establishment process with a new relay). The link modification request message 520 may include (e.g., all) the security parameters for establishing the security. According to embodiments, "re-use the same" may indicate that the security context used on the (e.g., current) link via the first relay WTRU 51 may be re-used on the (e.g., new) link to be established with a second (e.g., selected) relay WTRU 52. For example, parameters from the security context that may not be re-used (e.g. contextual count value) may be included in the security parameters with the (e.g., corresponding new) value to be used. According to embodiments, "on link establishment" may indicate that the security context may be established during the link establishment procedure with the second (e.g., selected) relay WTRU 52. For example, no security parameter may be included in the link modification request message 520.

According to embodiments, the link modification request message 520 may not include any indication of any security establishment method. A link modification request message 520 without any security establishment method indication, may indicate, for example, that that the security context may be established during the link establishment procedure with the second relay WTRU 502 (e.g., similarly to "on link establishment"). In another example, a link modification request message 520 without any security establishment method indication, may indicate that the (e.g., same) security context (e.g., already) used on the (e.g., current) link via the first relay WTRU 51 may be re-used on the (e.g., new) link to be established via a second (e.g., selected) relay WTRU 52. This may allow to skip (e.g., avoid, bypass) the direct security mode procedure, which may (e.g., usually) be executed during the link establishment procedure.

According to embodiments, a token may be exchanged during the link modification procedure between the source WTRU 51 and the target WTRU 52 (e.g., via the first relay WTRU 501). The token may be used, for example, during the link establishment procedure (e.g., via the second relay WTRU 502) to associate the current link (e.g., via the first relay WTRU 501) with the new link (e.g., via the second relay WTRU 502). For example, the token may also represent a relay re-selection indication.

According to embodiments, the token may be a (e.g., self-generated, random) number. For example, using a token once may allow to avoid replay attacks. For example, a new token may be generated when (e.g., each time) a link modification message may be sent.

According to embodiments, the token may include an information referring to the current link (e.g., via the first relay WTRU 501). For example, the information may be any of a source WTRU link identifier (e.g., the L2 ID of the source WTRU 51), the L2 ID of the target WTRU 52, the KD-session ID used in the communication over the first relay WTRU 501.

According to embodiments, in step 530, the target WTRU 52 may select a second relay WTRU 502, for example, from the list of relay WTRU candidates, received in the link modification request message 520. For example, the second relay WTRU 502 may be selected among the list of candidates based on any of a signal quality metric, a load of the candidates, a provisioned parameter. According to embodiments, the target WTRU 52 may select a security establishment method based on the (e.g., proposed) security establishment method received from the source WTRU 51.

According to embodiments the target WTRU 52 may select the "in advance" security establishment method. The target WTRU 52 may establish (e.g., in advance) the security context for the link to be established (e.g., via the selected relay) based on the security parameters from the source WTRU 51 (e.g., retrieved from the link modification request message 520) and based on its own security parameters. The target WTRU 52 may, for example, derive security keys based on the source WTRU security parameters and its own security parameters. The exchange of security information (e.g., the list of preferred algorithms and selected algorithm, Nonce, etc.) during the link modification procedure may allow the source and the target WTRUs to derive in advance security keys and to skip (e.g., avoid, bypass) the direct security mode procedure, which may (e.g., usually) be executed during the link establishment procedure.

According to embodiments, the target WTRU 52 may select the "re-use" security establishment method. The target WTRU 52 may obtain a (e.g., new) security context for the new link (e.g., via the second relay WTRU 51), at least partially based on a (e.g., existing) security context, that may be used on the current link (e.g., via the first relay WTRU 51). For example, some parameters may not be re-used from the existing security context ((e.g. count, KD-session ID). These parameters may be retrieved from the security parameters included in the link modification request message 520 and may be associated with the (e.g., new) security context to be used via the second relay WTRU 52. According to embodiments, the link modification request message 520 may not include any security parameters from the source WTRU 51. For example, the target WTRU 52 may use (e.g., save) any of default and convention security parameters in the (e.g., new) security context. According to embodiments, the (e.g., current) security context may be updated with the new security parameters and the WTRU may be allowed to reuse the already established security context. The "re-use" security establishment method may allow the WTRU to skip (e.g., avoid, bypass) the direct security mode procedure, which may (e.g., usually) be executed during the link establishment procedure.

According to embodiments the target WTRU 52 may process a direct security mode procedure 580, 590, to derive a new security context during the link establishment procedure via the selected second relay WTRU 502, e.g., to generate any of a fresh session key, a fresh integrity, confidentiality keys and (e.g., possibly) a fresh root key. For example, the direct security mode procedure 580, 590, may be processed on condition that the link modification request message 520 indicated an "on link establishment" security establishment method. For example, the direct security mode procedure 580, 590, may be processed on condition that the link modification request message 520 did not indicate any security establishment method. For example, the direct security mode procedure 580, 590, may be processed on condition that the target WTRU 52 does not support any of the security establishment methods indicated in the link modification request message 520.

According to embodiments, the direct security mode procedure 580, 590, may be skipped (e.g., not processed) in case any of the "in advance" and "re-use" security establishment methods may be processed.

According to embodiments, the target WTRU 52 may send a link modification accept message 540 to the source WTRU 51, via the first relay WTRU 501. The link modification accept message 540 may include (e.g., second information indicating) any of an identifier of the (e.g., selected) second relay WTRU 502, a target identifier such as e.g., a token (e.g. TokenB) e.g., for associating the second (e.g., new) link with the first (e.g., current) link, a security establishment method (e.g., selected by the target WTRU 52), and security parameters. For example, the target identifier (e.g., TokenB) may be any kind of identifier that may be used to associate the second (e.g., new link) to be established with the first link (e.g., to be replaced). For example, the target identifier (e.g., TokenB) may be a target (e.g., link) identifier (e.g., the L2 ID of the target WTRU 52). For example, the link modification accept message 540 may indicate an "in advance" security establishment method, and may include a (e.g., selected) security algorithm. In another example, the link modification accept message 540 may indicate a "re-use" security establishment method and may include e.g., a count (e.g., as security parameter). According to embodiments, the link modification accept message 540 may include an identifier of the target WTRU (T-WTRU-ID). For example, the T-WTRU-ID may be a new layer-2 ID, e.g., generated in advance by the target WTRU 52. The T-WTRU-ID may, for example, be used when establishing the new unicast link via the second relay WTRU 502. In another example, the T-WTRU-ID may be the user info of the target WTRU 502 (e.g., application layer ID of the target WTRU 502).

According to embodiments, the security establishment method(s) included in the link modification request message 520 (e.g., proposed by the source WTRU 51) may not be supported by (e.g., acceptable for) the target WTRU 52. For example, the target WTRU 52 may process (e.g., revert to) the "on link establishment" method. The target WTRU 52 may inform the source WTRU 51 via the link modification accept message 540 (e.g., by including an indication of the security establishment method selected by the target WTRU 52). For example, the source WTRU 51 may have provided security parameters for "in advance" and "on link establishment" methods and the target WTRU 52 may select any of the "in advance" and "on link establishment" methods. For example, the selection may be based on e.g. any of provisioning information, capabilities of the target WTRU. For example, a preferred order for selection may be set to e.g. first "in advance", second "re-use" and third "on link establishment".

According to embodiments, the target WTRU 52 may protect its token (e.g., TokenB), for example, before including it in the message based on the security establishment method. For example, the target WTRU 52 may use the new security context, or the previously used security context, similarly as for the link via the first relay WTRU 51.

According to embodiments, the security establishment method may be "in advance" e.g., the source WTRU may receive a link modification accept message 540 indicating the target WTRU 52 selected the "in advance" security establishment method. The source WTRU 51 may use the security information from the target WTRU 52 (e.g., security parameters received from the target WTRU 52) and its own security information (e.g., the chosen algorithm, Nonce, etc.) to derive (e.g., in advance) the security context (e.g., security keys) for the link to be established via the selected second relay WTRU 52 (e.g. RID2). According to embodiments, the security establishment method may be "re-use" e.g., the source WTRU may receive a link modification accept message 540 indicating the target WTRU 52 selected the "re-use" security establishment method. The source WTRU 51 may complete (e.g., update) the security context based on the provided security parameters. The updated security context may be used via the selected second relay WTRU 52. According to embodiments, the source WTRU 51 may send a (e.g., broadcast) DCR message 550 including (e.g., third information indicating) any of a (e.g., selected) relay identifier (RID) (e.g., received from the target WTRU 52), a target WTRU identifier (T-WTRU ID) (e.g. any of user info and layer-2 ID) and a target identifier (e.g., token) received from the target WTRU 52 (e.g., TokenB). For example, the DCR message 550 may be sent to the target WTRU via the selected relay.

According to embodiments, the broadcast DCR message 550 may be sent as cleartext (e.g., un-encrypted), enabling the selected relay to have access to the content (e.g., parameters) of the DCR message 550. For example, the source WTRU 51 may secure (e.g. encrypt) the TokenB using the security context (e.g., security keys) derived in advance or reused from the link with the first relay WTRU 51 (based on the security establishment method).

According to embodiments, in step 560, the second relay WTRU 502 may receive the DCR message 550 from the source WTRU 51. For example, the second relay WTRU 502 may check whether the (e.g., selected) relay identifier (RID) of the DCR message 560 may match its own RID. According to embodiments, the second relay WTRU 502 may forward the DCR message (e.g., only) if the (e.g., selected) relay identifier (RID) of the DCR message 560 matches its own RID. For example, in a case where the relay identifier of the received DCR may not match its own RID, the second relay WTRU 502 may delete the message without forwarding it.

According to embodiments, in a case where the (e.g., selected) relay identifier (RID) of the DCR message 560 may match its own RID, and in a case where the DCR message 560 may include an identifier of a target WTRU (T-WTRU ID), the second relay WTRU 502 may forward the message 570 to the target WTRU identified by the T-WTRU ID, for example in unicast mode. For example, the forwarded DCR message 570 may include the token (TokenB) as received (e.g., unchanged). TokenB may be used, for example, to identify the first (e.g., current) link to be replaced with the second (e.g., new) link. In a case where the DCR message 550 may not include and any target WTRU identifier, the DCR message 550 may be forwarded 570 in broadcast mode.

According to embodiments, in a case where the DCR message 550 may include a layer-2 ID as a T-WTRU-ID, the DCR message may be forwarded 570 to this (e.g., specific) layer-2 ID (e.g., in unicast mode instead of broadcast mode). In a case where the DCR message 550 may include user info such as e.g., a T-WTRU ID, the T-WTRU ID may remain within the forwarded DCR message 570 (e.g., payload) and the forwarded DCR message 570 may be broadcasted.

According to embodiments, the second relay WTRU 502 may remove the (e.g., selected) relay identifier (RID) received from the source WTRU in the DCR message 550. For example, the forwarded DCR message 570 (e.g., transmitted to the target WTRU 52) may not include the (e.g., selected) relay identifier (RID).

According to embodiments, the target WTRU 52 may receive the forwarded DCR message 570 (e.g., from the source WTRU via the selected relay WTRU). For example, the forwarded DCR message 570 may include an identifier (e.g., token) for identifying the first (e.g., current) link to be replaced with the second (e.g., new) link. For example, the target WTRU 52 may check that any of the T-WTRU ID and the identifier (e.g., token) included in the DCR message 570 may match any of its own T-WTRU ID and target identifier (e.g., token). For example, the target WTRU 52 may use its T-WTRU ID to retrieve any information associated with the new link currently being established (e.g. any of the selected RID, the established security context (e.g., keys), the target WTRU's token, the source WTRU's token, etc.). In a case where the identifier (e.g., token) included in the DCR message 570 may be confidentiality protected, the target WTRU 52 may use the security context (e.g., keys) associated with the new link to decrypt the identifier (e.g., token). For example, the target WTRU may validate (e.g., check) that the identifier (e.g., token) may match its target identifier (e.g., TokenB) as previously sent to source WTRU. For example, the target WTRU may verify (e.g., check) that the DCR message 570 may be received from its (e.g., previously) selected RID (e.g., RID2). For example, the target WTRU 52 may use the identifier (e.g., token) to retrieve the previous link to be replaced by the new link. The association between the application layer identifier and the unicast link via the first relay WTRU (RID1) may be updated with the new unicast link via the second relay WTRU (RID2), for example once (e.g., after) the traffic may be switched to the new link (via the second relay WTRU 52) e.g., at step S120. According to embodiments, the security keys may have (e.g., already) been derived by the target WTRU 52 and the target WTRU 52 may skip (e.g., avoid, bypass) triggering the direct security mode (DSM) procedure 580, 590. According to embodiments, the security keys may be re-used from the previous link (e.g., via the first relay WTRU 501) and the target WTRU 52 may skip (e.g., avoid, bypass) triggering the DSM procedure 580, 590.

According to embodiments, in a case where the security context (e.g., keys) may not be established in advance or in a case where the security context (e.g., keys) from the previous link may not be re-used, the target WTRU 52 may initiate (e.g., trigger) a direct security mode procedure, via the second relay WTRU 52, for example, by sending a DSM command message 580 to the source WTRU 51 via the second relay WTRU 502. According to embodiments, the DSM command 580 may include the source WTRU token (e.g., TokenA).

According to embodiments, the source WTRU 51 may use the token of (e.g., included in) the received DSM command 580 (e.g., TokenA) to validate that the message may be associated with the previous link with the first relay WTRU 501. For example, the source WTRU 51 may send a direct security mode complete message 590 to the target WTRU 52 via the second relay WTRU 502. According to embodiments, the security may be established on the link (e.g., the source and target WTRUs may obtain the security context).

According to embodiments, e.g., in a case where the identifier (e.g., token) included in the received DCR message 570 matches the target identifier (e.g., TokenB) that may have been included in the link modification accept message 540, the target WTRU 52 may send a DCA message 5100 which may include the identifier (e.g., token) from the source WTRU 51 (e.g., TokenA, as received from the link modification request message 520). For example, the DCA message 5100 may be secured based on the security keys associated with this link via the second relay WTRU 502. According to embodiments, the token may not be included in the DCA message 5100 in a case where the DSM process may be performed.

According to embodiments, the source WTRU 51 may receive the DCA message 5100 via the second relay WTRU 502. The source WTRU 51 may retrieve any of the security keys and security parameters. In a case where the DCA message 5100 includes (e.g., an identifier that matches) the source WTRU's token (e.g., source identifier, TokenA), the source WTRU 51 may associate the DCA message 5100 with the previous link via the first relay WTRU 501, based on the token. In step S110, a (e.g., new PC5 unicast) link may be established between the source WTRU 51 and the target WTRU 52 via the second relay WTRU 502.

According to embodiments, in step S120, any of the source 51 and target 52 WTRUs may switch the data traffic to the (e.g., new PC5 unicast) link via the second relay WTRU 502. In other words, any of the source 51 and target 52 WTRUs may stop transmitting packets (respectively directed to the target 52 and the source 51 WTRUs) to the first relay WTRU 501 and may transmit them to the second relay WTRU 502.

Figure 6:
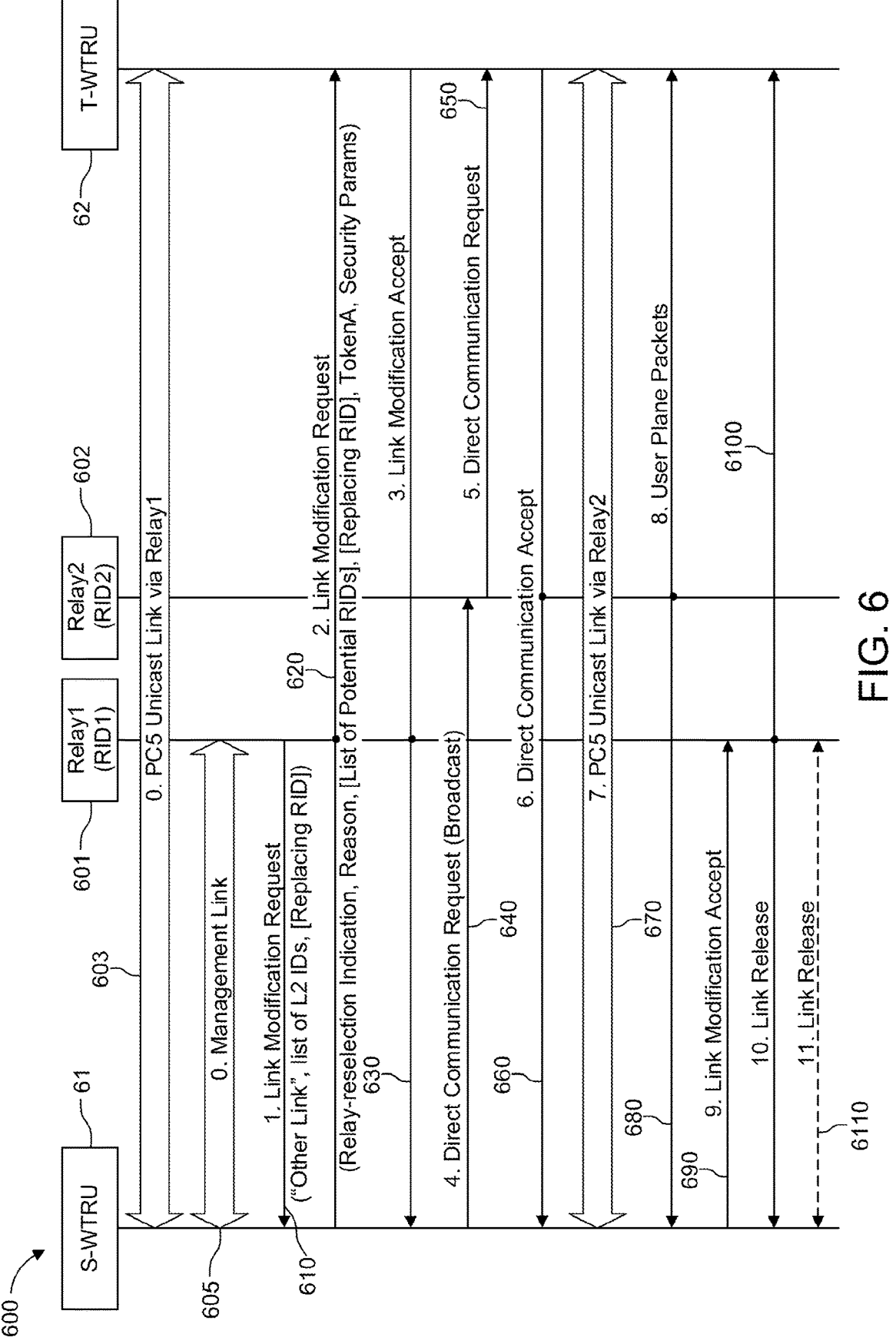
FIG. 6 is a diagram illustrating an example of a method for changing of layer-2 WTRU to WTRU relay, triggered by the relay WTRU.

According to embodiments, any of the source and target WTRUs may send a link release message via the first relay WTRU 501 to terminate the previous link (not represented).
Example of a Method for Changing of Layer-2 WTRU to WTRU Relay Triggered by the Relay WTRU FIG. 6 is a diagram illustrating an example of a method 600 for changing of layer-2 WTRU to WTRU relay, triggered by the relay WTRU 601. According to embodiments, a change of relay WTRU 601 may be triggered by the (e.g., current) relay WTRU 601 (which may be referred to herein as the first relay WTRU). For example, the first relay WTRU 601 may be scheduled for maintenance. In another example, the first relay WTRU 601 may be configured to offload some traffic (e.g., connections).

According to embodiments, a (e.g., PC5 end to end) unicast link 603 may have been established between a source WTRU 61 and a target WTRU 62 via the first relay WTRU 601, according to an embodiment described herein. Any of the source and target WTRUs may send and/or receive messages (e.g., packets) to/from the first relay WTRU 601, configured to process a layer-2 WTRU to WTRU relay method. According to embodiments a management link 605 may be established between the source WTRU 61 and the first relay WTRU 601.

According to embodiments, the first relay WTRU 601 may inform the source WTRU 61 that a change of relay may be processed. For example, the first relay WTRU 601 may send e.g. any of a link modification request message, a link release message, and any other PC5-S message over the management link 605. The message may include a (e.g., new) information indicating any of a (e.g., pending) relay change and a timer indicating that the first relay WTRU 601 may not be available upon expiry of the timer. The source WTRU 61 may initiate the change of relay with the target WTRU 62 (e.g., according to embodiments described herein). A new link may be established via the second relay WTRU 602. The traffic may be moved (e.g., switched) from the initial link via the first relay WTRU 601 to the new link via the second relay WTRU 602.

According to embodiments, the first relay WTRU 601 may send, for example, a link modification request message 610 to the source WTRU 61, via e.g., the management link 605. For example, the link modification request message 610 may include any of information indicating "other link", and a (e.g., list, set) of link identifiers representing (e.g., identifying) the links to be moved to another relay WTRU. For example, a link may be identified by the pair of source WTRU layer-2 ID (S-WTRU-L2 ID) and target WTRU layer-2 ID (T-WTRU-L2 ID), that may be used to send PC5-S (e.g., signaling) messages and user traffic over the link. For example, the first relay WTRU 601 may include any of a replacing relay ID (RID) and any number of candidate RIDs. For example, several relay WTRUs with similar (e.g., same) capabilities may be in the same area. Embodiments described herein may allow the network to select the replacing relay WTRU without the source WTRU 61 processing the relay discovery procedure.

According to embodiments, the source WTRU 61 may receive the link modification request message 610. For example, the source WTRU 61 may determine that the link modification request message 610 may be applicable to another link (e.g., and not to the management link) based on the "other link" indication. For example, the source WTRU 61 may obtain the link to which the link modification request message 610 may apply, based on the layer-2 IDs (e.g., included in the link modification request message 610). For example, the source WTRU 61 may determine that the relay WTRU (e.g., identified by the replacing RID) may be reachable by the source WTRU 61. The source WTRU 61 may send a link modification request message 620 to the target WTRU 62 (e.g., over the other link indicated in the link modification request message 610) via the first relay WTRU 601. The link modification request message 620 may include similar (e.g., same) parameters as the link modification request message 520 described in FIG. 5. The link modification request message 620 may (e.g., additionally) include the replacing RID. For example, a link modification request message 620, including a (e.g., single) replacing ID may not include a set (e.g., list) of candidate RIDs.

According to embodiments, the target WTRU 62 may determine whether the link modification request message 620 includes a replacing RID. For example, the target WTRU 62 may determine that the relay WTRU identified by the replacing RID may be reachable (e.g., accessible) by the target WTRU 62. For example, the replacing RID may be selected in a case where the replacing RID may be reachable. In a case where the replacing RID may not be reachable, the target WTRU 62 may, for example, select another RID from the list of candidate RIDs. In another example, the target WTRU 62 may initiate (e.g., trigger) a relay discovery procedure (e.g., in a case where a list of candidate RIDs may not be provided) and select a RID. According to embodiments, the target WTRU may send a link modification accept (e.g., link modification response) message 630 to the source WTRU 61 that may include the selected RID. According to embodiments, the link modification accept message 630 may include similar (e.g., same) parameters as the link modification accept message 540 described in FIG. 5.

According to embodiments, the source WTRU 61 may send a broadcast DCR message 640, for example, including similar (e.g., same) parameters as the DCR message 550 described in FIG. 5.

According to embodiments, the second relay WTRU 602 (e.g., identified by the selected RID) may receive the DCR message 640. For example, the second relay WTRU 602 may forward the DCR message 650 to the target WTRU 62.

According to embodiments, the target WTRU 62 may send a DCA message 660, for example, including similar (e.g., same) parameters as the DCA message 5100 described in FIG. 5. For example, the target WTRU 62 may skip (e.g., bypass, avoid) the security establishment (DSM Command/ Complete) in a case where the security context (e.g., keys) may (e.g., already) be established, or in a case where the security context (e.g., keys) may be re-used from the previous link via the first relay WTRU 601.

According to embodiments, the source WTRU 61 may receive the DCA message 660 via the second relay WTRU 602. According to embodiments, a link 670 may be established via the second relay WTRU 602.

According to embodiments, any of the source 61 and target 62 WTRUs may switch the data traffic 680 to the (e.g., new) link 670 via the second relay WTRU 602. In other words, any of the source 61 and target 62 WTRUs may stop transmitting packets 680 (directed respectively to the target 62 and the source 61 WTRUs) to the first relay WTRU 601 and may transmit them to the second relay WTRU 602.

According to embodiments, the source WTRU 61 may send a link modification accept message 690 to the first relay WTRU 601 via the management link 605. This message may indicate that the link may have been modified (e.g., as requested, moved to another relay WTRU).

According to embodiments, the link 603 between the source WTRU 61 and the target WTRU 62 via the first relay WTRU 601 may be released 6100. For example, the link release may be initiated (e.g., triggered) by any of the source 61 and the target 62 WTRUs.

According to embodiments, the management link 605 between the source WTRU 61 and the first relay WTRU 601 may be released 6110. For example, the management link 605 may be used to manage other links, e.g., links with other target WTRUs. For example, the management link 605 may be released (e.g., only) in a case where no other links from the source WTRU 61 via the first relay WTRU 601 may exist (e.g., be established).

Figure 7:
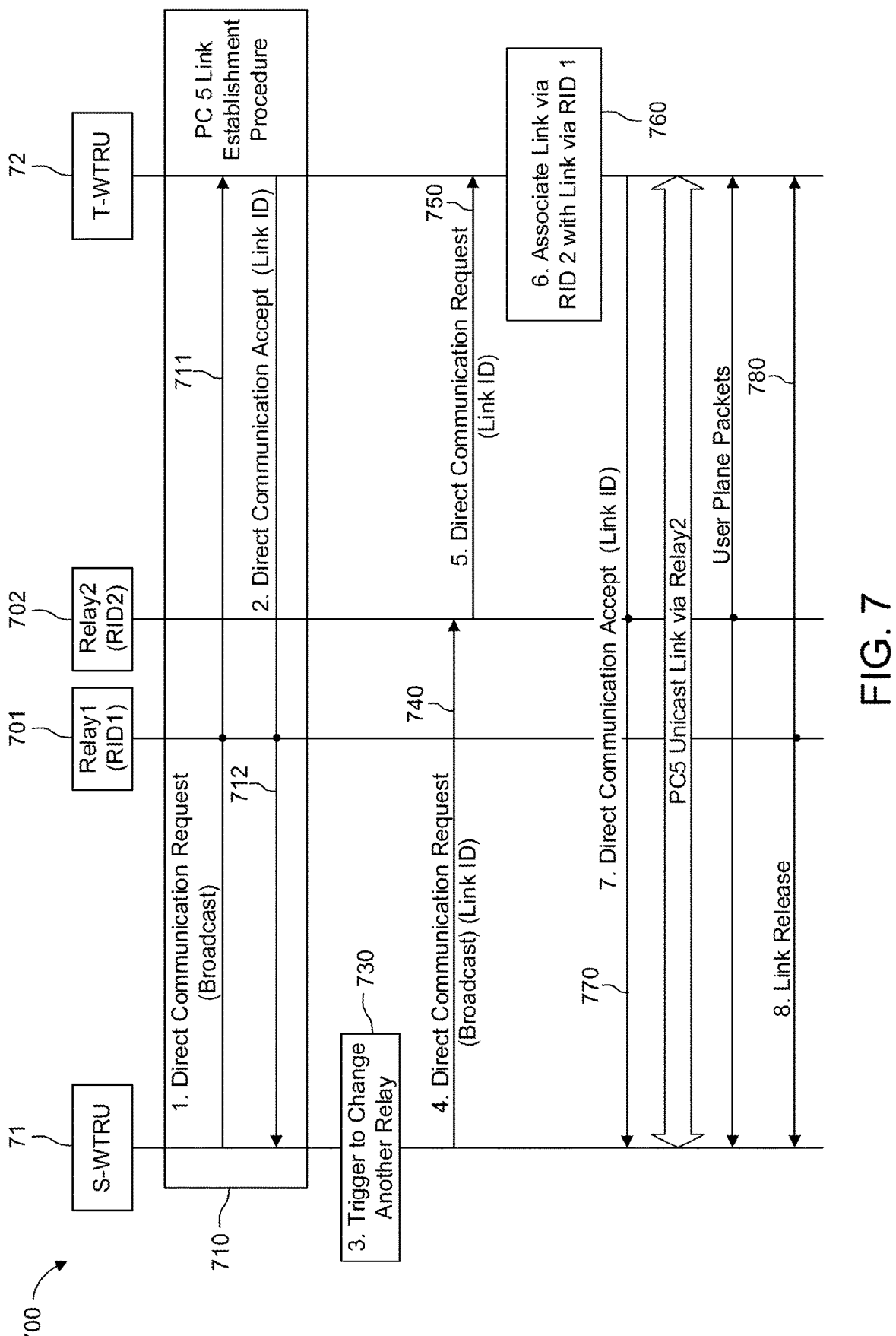
FIG. 7 is a diagram illustrating an example of a method for changing of layer-2 WTRU to WTRU relay, based on a link identifier exchange.

Example of a Method for Changing of Layer-2 WTRU to WTRU Relay Based on a Link ID Exchange FIG. 7 is a diagram illustrating an example of a method 700 for changing layer-2 WTRU to WTRU relay, based on a link identifier (ID) exchange. According to embodiments, a link ID may be assigned to the (e.g., PC5 unicast) link, for example during the PC5 link establishment procedure 710. For example, a new relay WTRU may be selected. For example, the source WTRU 71 may include the link ID of the link to be moved in the DCR message 740. For example, the target WTRU 72 may associate the PC5 link via the new relay with the PC5 link via the initial relay WTRU.

According to embodiments, a first (e.g., PC5 unicast) link may be established between the source WTRU 71 and the target WTRU 72 via the first relay WTRU 701. The source WTRU 71 may send a DCR (e.g., broadcast) message 711 to the first relay WTRU 701, which may be re-broadcasted by the first relay WTRU 701 and received by the target WTRU 72, for example, as described in FIG. 2.

According to embodiments, the target WTRU 72 may send a DCA message 712 to the source WTRU 71, for example, similarly as described in FIG. 2. According to embodiments, the DCA message 712 may include a link ID (LID), for example, assigned (e.g., allocated) by the target WTRU 72 to the (e.g., currently established PC5 unicast) link. The link ID may allow to locate (e.g., retrieve, identify) the context of the link (e.g., any of source/destination L2 IDs, security context, application layer ID).

According to embodiments, in step 730, the source WTRU 71 may, for example, detect a condition for changing of relay. In another example, the source WTRU 71 may receive a trigger (e.g., a link modification request from the first relay WTRU 701) to change of relay.

According to embodiments, the source WTRU 71 may initiate a (e.g., PC5 unicast) link establishment procedure, for example, by sending a DCR message 740 including the link ID of the PC5 link to be switched (e.g., LID1) and an identifier of the target WTRU 72 (T-WTRU ID), such as, for example, the user info of the target WTRU 72.

According to embodiments, the source WTRU 71 may select the replacing relay and send the DCR message 740 to the selected relay (e.g. RID2), for example, by including the LID (LID1) in the broadcast DCR message 740.

According to embodiments, the second relay WTRU 702 may forward the DCR message 750, similarly as described in FIG. 2.

According to embodiments, in step 760, the target WTRU 760 may associate the link to be established via the second relay WTRU 702 (e.g., the second link) with the link established via the first relay WTRU 701 (e.g., first link), for example, based on the received link ID (LID1).

According to embodiments, a DCA message 770 may be sent from the target WTRU 72 to the source WTRU 71 via the second relay WTRU 702. For example, the DCA message 770 may include a link ID. According to embodiments, the link ID in the DCA message 70 may be any a newly assigned one (e.g. LID2) and an already assigned one (LID1);

According to embodiments, a DCA message 770 may be sent from the target WTRU 72 to the source WTRU 71 via the second relay WTRU 702. For example, the DCA message 770 may include a link ID. According to embodiments, the link ID in the DCA message 70 may be any newly assigned one (e.g. LID2) and an already assigned one (LID1);

According to embodiments, any of the source 71 and the target 72 WTRUs may initiate (e.g., trigger) a PC5 link release procedure 780 for the (e.g., first) PC5 link via the first relay WTRU 701, for example, after the (e.g., second) PC5 link may be established via the second relay WTRU 702.

Figure 8:
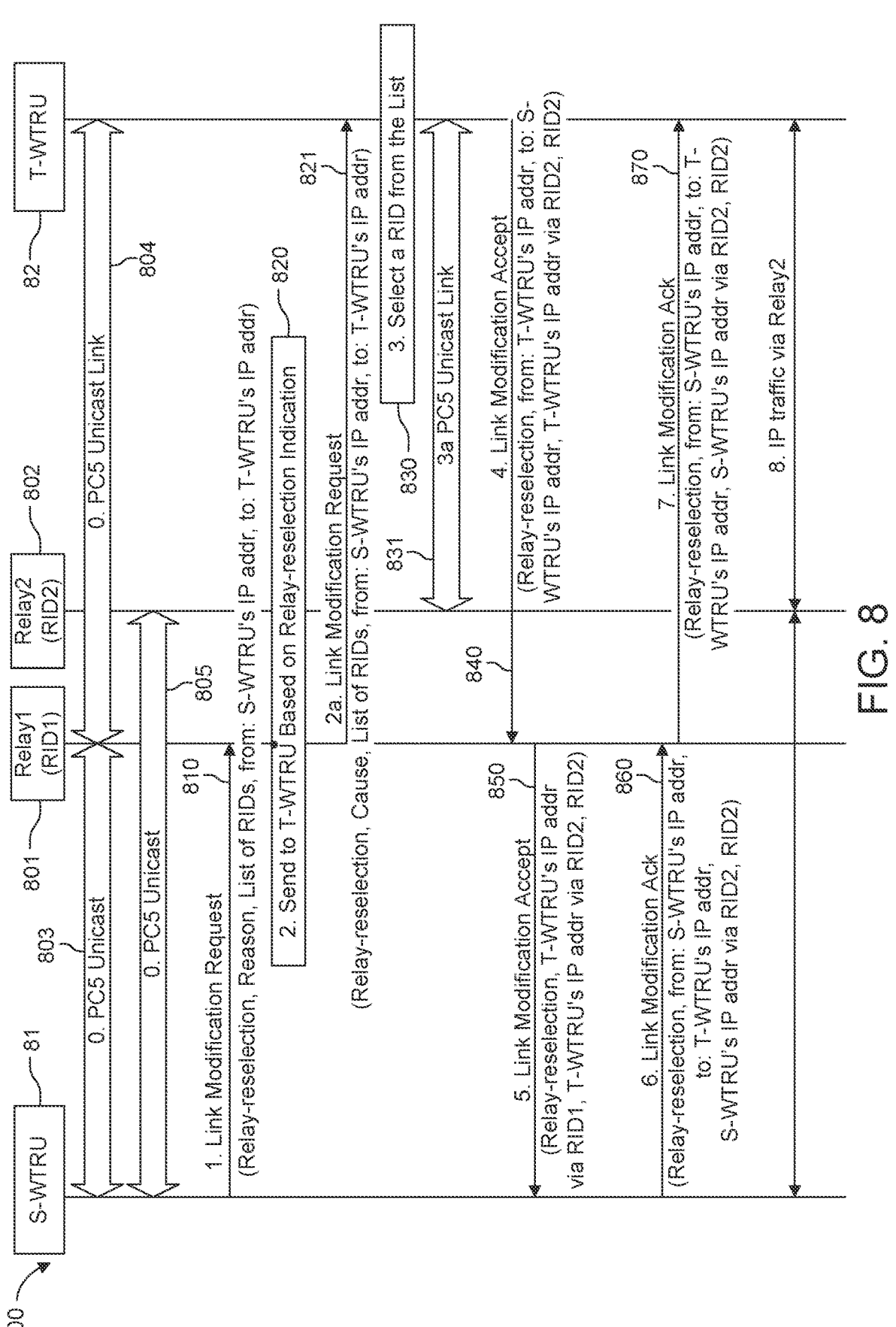
FIG. 8 is a diagram illustrating an example of a method for changing of layer-3 WTRU to WTRU relay, based on PC5 signaling

Example of a Method for Changing of Layer-3 WTRU to WTRU Relay Based on PC5 Signaling FIG. 8 is a diagram illustrating an example of a method 800 for changing of layer-3 WTRU to WTRU relay, based on PC5 signaling. According to embodiments, a layer-3 relay WTRU 801 may forward data between a source WTRU 81 and a target WTRU 82 based on two (e.g., separate PC5 unicast) links 803, 804, established between the relay WTRU 801 and respectively the source WTRU 81 and the target WTRU 82, as described, for example, in FIG. 3. The source WTRU 81 and the target WTRU 82 may communicate by exchanging, for example, IP packets relayed by the first relay WTRU 802 over the (e.g., PC5 unicast) links 803, 804.

According to embodiments, a first (e.g., PC5 unicast) link 803 may be established between the source WTRU 81 and the first relay WTRU 801. A second (e.g., PC5 unicast) link 804 may be established between the target WTRU 82 and the first relay WTRU 801. The source 81 and the target 82 WTRUs may exchange IP packets via the first relay WTRU 801 based on the first 803 and the second 804 links. According to embodiments, a third (e.g., PC5 unicast) link 805 may be established between the source WTRU 81 and the second relay WTRU 802.

According to embodiments, the source WTRU 81 may, for example, detect a condition for changing of relay. In another example, the source WTRU 81 may receive a trigger (e.g., a link modification request from the first relay WTRU 801) to change of relay. According to embodiments, the source WTRU 81 may send a link modification request message 810 (e.g., on the first link 803) to the first relay WTRU 801, e.g., for being forwarded to the target WTRU 82 for requesting a change of relay. For example, the link modification request message 810 may include (e.g., first information indicating) any of a relay reselection indication (e.g., indicating a request for changing of a relay), a reselection reason (e.g., any of QoS not met, low signal, relay maintenance), a list of candidate relay WTRUs (e.g., RIDs). The link modification request message 810 may indicate any of the IP address/prefix of the source WTRU 81 and the IP address/prefix of the target WTRU 82 (e.g., for communication between the source WTRU 81 and the target WTRU 82 via the first relay WTRU 801).

According to embodiments, the list of candidate relay WTRUs may be obtained (e.g., selected) based on (e.g., PC5 unicast) links that may have been already established with such relay WTRUs (RIDs).

According to embodiments, IP addresses/prefixes of any number of target WTRUs may be included in the link modification request message 810, for example, in a case where the source WTRU 81 is communicating with any number of target WTRUs via the first relay WTRU 801.

According to embodiments, in step 820, the first relay WTRU 801 may determine (e.g., detect) whether the link modification request message 810 may be destined to the target WTRU 82 based on the relay reselection indication and on the IP address/prefix of the target WTRU 82 (e.g., that may be included in the link modification request message 810).

According to embodiments, the first relay WTRU 801 may determine (e.g., validate) that the source WTRU IP address/prefix included in the link modification request message 810 may be valid. This, for example, may avoid a WTRU performing an attack by including the IP address of another WTRU to tear down this other WTRU's connection.

According to embodiments, the first relay WTRU 801 may determine (e.g., validate) that the source WTRU IP address/prefix included in the link modification request message 810 may be valid. This, for example, may avoid a WTRU performing an attack by including the IP address of another WTRU to tear down this other WTRU's connection.

According to embodiments, the first relay WTRU 801 may send a link modification request message 821 to the IP address/prefix of the target WTRU (e.g., as included in message 810). In a case where the link modification request message 810 may include a plurality of IP addresses/prefixes (e.g., of a plurality of target WTRUs), the first relay WTRU 801 may send a link modification request to (e.g., each of) these target WTRUs.

According to embodiments, in step 830, the target WTRU 82 may determine that the communication with the source WTRU 81 may be handled via another relay WTRU, for example, based on the relay reselection indication. For example, the target WTRU 82 may obtain (e.g., select) a relay WTRU (e.g., identifier) RID from the list of candidate relay identifiers (RIDs). For example, the target WTRU 82 may obtain (e.g., select) a RID (e.g., of a selected relay WTRU) with which a (e.g., PC5 unicast) link may already be established. In another example, the target WTRU 82 may establish a fourth (e.g., new) link 831 with the (e.g., selected relay WTRU identified by the) selected RID.

According to embodiments, the target WTRU 82 may send a link modification accept message 840 e.g., on a second link 804 to the first relay WTRU 801 for being forwarded to the source WTRU 81. The link modification accept message 840 may include (e.g., second information indicating) any of a relay reselection indication, the IP address/prefix of the source WTRU 81, the IP address/prefix of the target WTRU 82 via the first relay WTRU 801, the IP address/prefix of the target WTRU 82 e.g., for communication between the source WTRU and the target WTRU via the second (e.g., selected) relay WTRU 802 and an identifier of the second (e.g., selected) relay WTRU 802 (RID2).

According to embodiments, the first relay WTRU 801 may send a link modification accept message 850 to the source WTRU 81 (e.g., based on the relay reselection indication). For example, the link modification accept message 850 may be sent to the source WTRU 81, using the IP address/prefix of the source WTRU 81 (e.g., included in the message 840), e.g. on the first link 803.

According to embodiments, the source WTRU 81 may extract (e.g., retrieve) the selected RID (e.g., RID2) from the received link modification accept message 850. The source WTRU 81 may send, e.g., on the first link 803 to the first relay WTRU 801, a link modification acknowledge (ack) message 860, for example, including the source WTRU's IP address/prefix associated with RID2 (e.g., for communication between the source WTRU 81 and the target WTRU 82 via the selected relay WTRU 802). The link modification ack message 860 may be sent by the source WTRU 81 for acknowledging the change of relay towards the target WTRU 82.

According to embodiments, the first relay WTRU 801 may send a link modification ack message 870 to the target WTRU 82.

According to embodiments, any of the source and the target WTRUs may switch the IP traffic (e.g., from respectively the first link 803 and the second link 804) to respectively the third link 805 and the fourth link 831 via the second relay WTRU 802. Exchanging their respective IP address/prefix in the link modification messages (request/accept) may allow any of the source and the target WTRUs to skip (e.g., avoid, not perform) DNS queries with the second relay WTRU 802.

Figure 9:
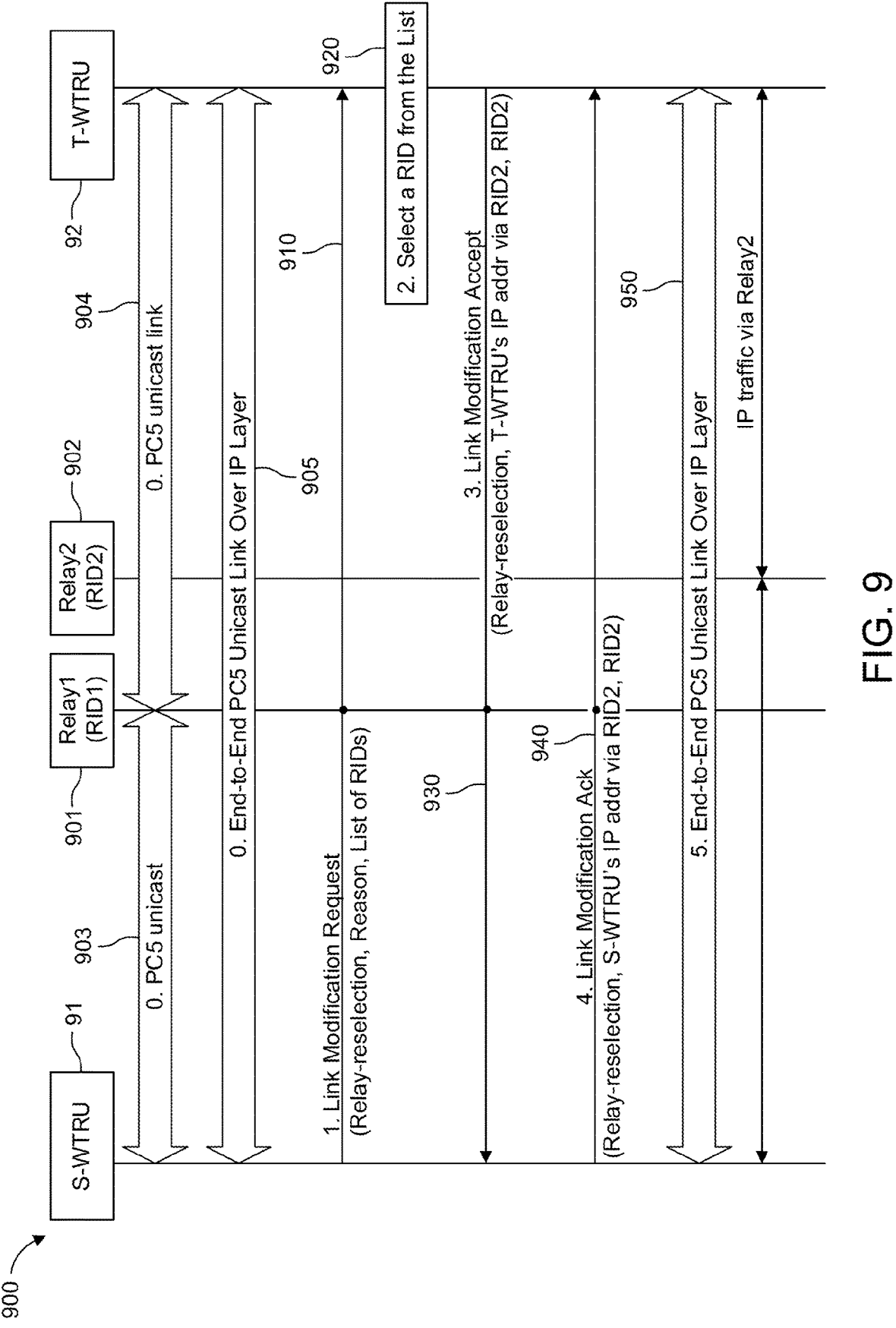
FIG. 9 is a diagram illustrating an example of a method for changing of layer-3 WTRU to WTRU relay, based on an end to end PC5 unicast link.

Example of a Method for Changing of Layer-3 WTRU to WTRU Relay Based on an End to End PC5 Unicast Link FIG. 9 is a diagram illustrating an example of a method 900 for changing of layer-3 WTRU to WTRU relay, based on an end-to-end (e.g., PC5 unicast) link 905. According to embodiments, an end-to-end (e.g., PC5 unicast) link 905 may be established between a source 91 and a target 92 WTRUs.

According to embodiments, a first (e.g., PC5 unicast) link 903 may be established between the source WTRU 91 and the first relay WTRU 901. A second (e.g., PC5 unicast) link 904 may be established between the target WTRU 92 and the first relay WTRU 901. The source 91 and the target 92 WTRUs may exchange IP packets via the first relay WTRU 901 based on the first 903 and the second 904 links.

According to embodiments, the source 91 and the target 92 WTRUs may establish an (e.g., end to end PC5 unicast) link 905, for example over the user plane. For example, the source 91 and the target 92 WTRUs may exchange PC5 signaling messages encapsulated in IP packets and relayed via the first relay WTRU 901.

According to embodiments, the source WTRU 91 may, for example, detect a condition for changing of a relay. In another example, the source WTRU 91 may receive a trigger (e.g., a link modification request from the first relay WTRU 901) to change of relay. According to embodiments, the source WTRU 91 may send a link modification request message 910 to the target WTRU 92, for example, over the end-to-end link 905 via the first relay WTRU 901. For example, the link modification request message 910 may include any of a relay reselection indication (e.g., indicating a request for changing of a relay), a reselection reason (e.g., any of QoS not met, low signal, relay maintenance), a list of candidate relay WTRUs (e.g., RIDs).

According to embodiments, the list of candidate relay WTRUs may be obtained (e.g., selected) based on (e.g., PC5 unicast) links that may have been already established with such relay WTRUs (RIDs).

According to embodiments, in step 920, the target WTRU 92 may determine (e.g., detect) whether the link 905 may be switched via another relay WTRU based on the relay reselection indication. For example, the target WTRU 92 may obtain (e.g., select) a RID from the list of candidate RIDs. For example, the target WTRU 92 may obtain (e.g., select) a RID with which a (e.g., PC5 unicast) link may already be established. In another example, the target WTRU 92 may establish a (e.g., new) link with the selected RID.

According to embodiments, the target WTRU 92 may send a link modification accept message 930, including any of a relay reselection indication, an IP address/prefix of the target WTRU 92 via the second relay WTRU 902, and an identifier of the second relay WTRU 902 (RID2).

According to embodiments, the source WTRU 91 may receive the link modification accept message 930 from the target WTRU. For example, the source WTRU 91 may extract the selected RID (RID2) from the link modification accept message 930. For example, the source WTRU 91 may send a link modification ack message 940 to the target WTRU 92, including, for example, its IP address/prefix associated with RID2.

According to embodiments, the source 91 and the target 92 WTRUs may establish an (e.g., end-to-end PC5 unicast) link 950 via the second relay WTRU 902 (RID2).

According to embodiments, any of the source and the target WTRUs may switch the IP traffic to link 950 via the second relay WTRU 902.

Example of Using DNS to Obtain the Target WTRU and Select a New Relay

According to embodiments, a source WTRU may use DNS to determine to which other relay WTRU a target WTRU may be connected. For example, the source WTRU may select the second relay WTRU (RID2), e.g., itself. According to embodiments, a link modification request message may be sent by the source WTRU to the target WTRU via the first relay WTRU, including, for example, any of the selected RID and the IP address/prefix of the source WTRU via the selected RID.

According to embodiments, the target WTRU may send back a link modification accept message to accept the selected relay WTRU (RID2).

According to embodiments, the source WTRU may initiate (e.g., trigger) the establishment of a (e.g., PC5 unicast) link via the second relay WTRU (RID2), and traffic may be switched via the second relay WTRU (RID2).

According to embodiments, messages, such as, for example, any of change relay request and accept messages may be exchanged over the user plane. For example, the first relay WTRU may forward IP packets without inspecting them (e.g., for processing the content of the messages). Any of the source and the target WTRUs may select the new relay WTRU. For example, the selection of the new relay may be based on DNS queries. In another example, the selection of the new relay may be based on messages exchanged between the source WTRU and the target WTRU.

Figures 10, 11:
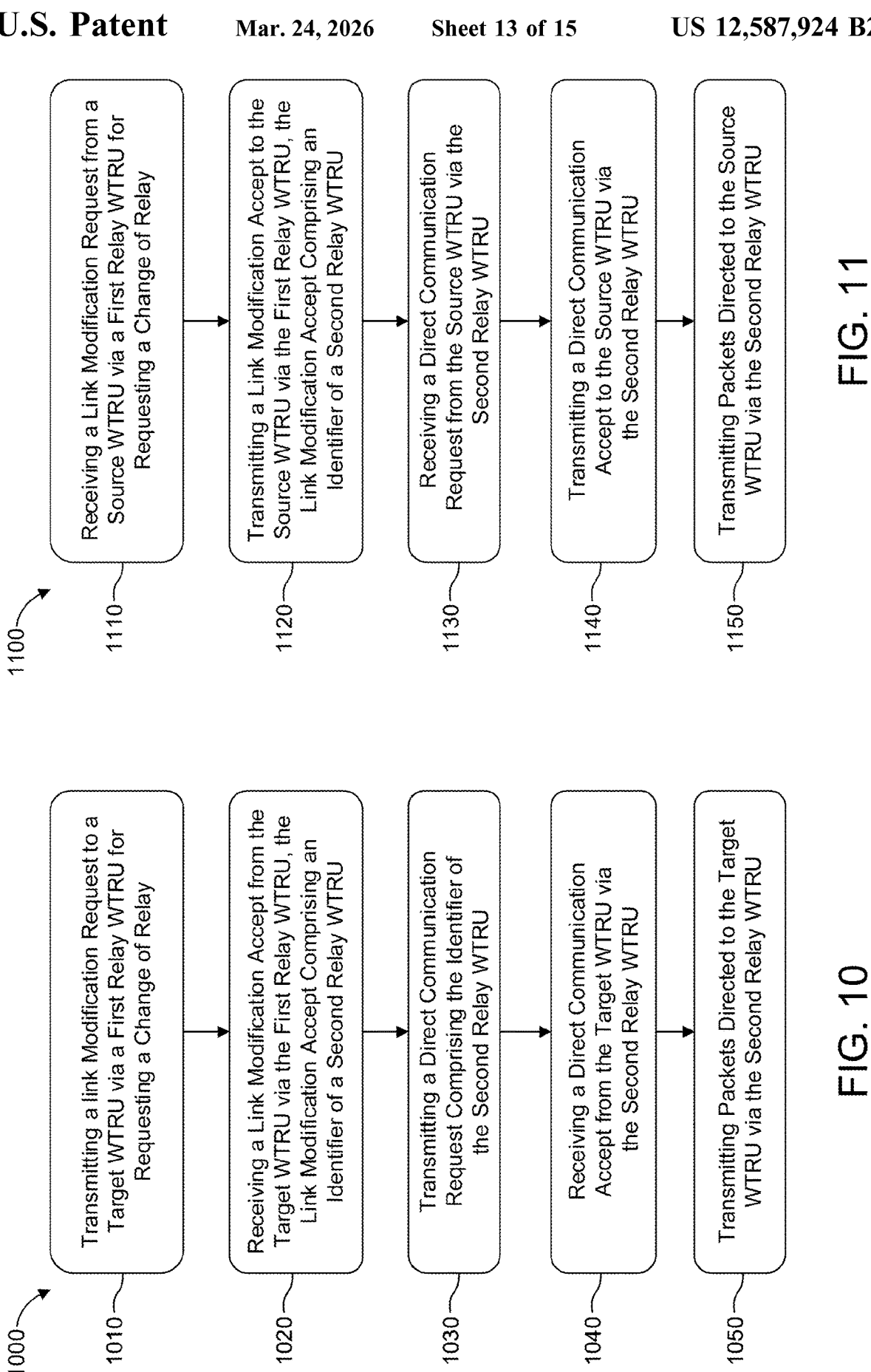
FIG. 10 is a diagram illustrating an example of a method for changing of relay, in a source WTRU.
FIG. 11 is a diagram illustrating an example of a method for changing of relay, in a target WTRU.

FIG. 10 is a diagram illustrating an example of a method 1000 for changing of relay, in a source WTRU. According to embodiments, in step 1010, the source WTRU may transmit a link modification request to a target WTRU via a first relay WTRU for requesting a change of relay. According to embodiments, the source WTRU may transmit the link modification request based on detecting a condition for the change of relay. According to embodiments, the source WTRU may transmit the link modification request based on receiving a trigger for the change of relay from the first relay WTRU. According to embodiments, the trigger for the change of relay may comprise an initial link modification request received from the first relay WTRU. According to embodiments, the initial link modification request may comprise any of a replacing relay identifier and a list of identifiers identifying candidate replacing relays.

According to embodiments, in step 1020, the source WTRU may receive a link modification accept from the target WTRU via the first relay WTRU. The link modification accept may comprise an identifier of a second relay WTRU.

According to embodiments, in step 1030, the source WTRU may transmit a direct communication request comprising the identifier of the second relay WTRU, e.g., indicating to the target WTRU an acceptance (e.g., confirmation) of the second relay WTRU.

According to embodiments, in step 1040, the source WTRU may receive a direct communication accept from the target WTRU via the second relay WTRU, e.g., indicating the traffic may be relayed via the second relay WTRU.

According to embodiments, in step 1050, the source WTRU may transmit packets directed to the target WTRU via the second relay WTRU.

FIG. 11 is a diagram illustrating an example of a method 1100 for changing of relay, in a target WTRU. According to embodiments, in step 1110, the target WTRU may receive a link modification request from a source WTRU via a first relay WTRU for requesting a change of relay. According to embodiments, in step 1120, the target WTRU may transmit a link modification accept to the source WTRU via the first relay WTRU. For example, the link modification accept may comprise an identifier of a second relay WTRU. According to embodiments, in step 1130, the target WTRU may receive a direct communication request from the source WTRU via the second relay WTRU. According to embodiments, in step 1140, the target WTRU may transmit a direct communication accept to the source WTRU via the second relay WTRU. According to embodiments, in step 1150, the target WTRU may transmit packets directed to the source WTRU via the second relay WTRU.

According to embodiments, any of the initial link modification request and the link modification request may comprise a list of identifiers identifying candidate replacing relays. According to embodiments, any of the source WTRU and the target WTRU may select the identifier of a second relay WTRU in the list of identifiers.

According to embodiments, the link modification request may comprise any of a relay reselection indication, a reason indication, a first token, a security establishment method indication and security parameters.

According to embodiments, the security establishment method indication may indicate establishing a security context for a second link according to the security parameters included in the link modification request. According to embodiments, the security context for the second link may be established before establishing the second link via the second relay WTRU.

According to embodiments, the security establishment method indication may indicate re-using a same security context for a second link via the second relay WTRU as already used for a first link via the first relay WTRU.

According to embodiments, the link modification request may indicate establishing a security context for a second link when establishing the second link via the second relay WTRU.

According to embodiments, the link modification accept may further comprise any of a selected security establishment method indication, a target WTRU identifier, and a second token.

According to embodiments, the direct communication request may further comprise any of the target WTRU identifier and the second token.

According to embodiments, the direct communication accept message may comprise the first token.

FIG. 12 is a diagram illustrating an example of a (e.g., Layer 2 based) method 1200 for changing of relay, in a source WTRU. According to embodiments, in step 1210, a link modification request message may be transmitted by a source WTRU on a first link to a target WTRU via a first relay WTRU for requesting a change of relay. For example, the link modification request message may comprise first information indicating any of a relay reselection indication, a list of candidate relay identifiers and a source identifier.

According to embodiments, the source WTRU may transmit the link modification request based on detecting a condition for the change of relay. According to embodiments, the source WTRU may transmit the link modification request based on receiving a trigger for the change of relay from the first relay WTRU. According to embodiments, the trigger for the change of relay may comprise an initial link modification request received from the first relay WTRU. According to embodiments, the initial link modification request message may comprise any number of link identifiers (e.g., any of a link identifier and a plurality of link identifiers) representing the links to be moved and any number of candidate relay identifiers (e.g., identifying any number of candidate relays).

According to embodiments, in step 1230, a link modification accept message may be received by the source WTRU from the target WTRU via the first relay WTRU. For example, the link modification accept message may comprise second information indicating any of a relay identifier of a selected relay WTRU and a target identifier for associating a second with the first link.

According to embodiments, in step 1240, a direct communication request (DCR) message may be transmitted by the source WTRU to the target WTRU via the selected relay WTRU. For example, the DCR message may comprise third information indicating the target identifier for identifying the first link to be replaced with the second link.

According to embodiments, in step 1250, a direct communication accept (DCA) message may be received by the source WTRU from the target WTRU via the selected relay WTRU.

According to embodiments, in step 1260, on a condition that an identifier included in the received DCA message matches the source identifier, data traffic may be switched by the source WTRU from the first link to the second link via the selected relay WTRU.

FIG. 13 is a diagram illustrating an example of a (e.g., Layer 2 based) method 1300 for changing of relay, in a target WTRU. According to embodiments, in step 1310, a link modification request message may be received by a target WTRU on a first link from a source WTRU via a first relay WTRU for requesting a change of relay. For example, the link modification request message may comprise first information indicating any of a relay reselection indication, a list of candidate relay identifiers and a source identifier.

According to embodiments, in step 1320, a relay WTRU may be selected by the target WTRU based on the list of candidate relay identifiers.

According to embodiments, in step 1330, a link modification accept message may be transmitted by the target WTRU to the source WTRU via the first relay WTRU. For example, the link modification accept message may comprise second information indicating any of a relay identifier of a selected relay WTRU and a target identifier for associating a second link with the first link.

According to embodiments, in step 1340, a direct communication request (DCR) message may be received by the target WTRU from the source WTRU via the selected relay WTRU.

According to embodiments, in step 1350, on a condition that an identifier included in the received DCR message matches the target identifier a direct communication accept (DCA) message may be transmitted by the target WTRU to the source WTRU via the selected relay WTRU.

According to embodiments, in step 1360, data traffic may be switched by the target WTRU from the first link to the second link via the selected relay WTRU.

According to embodiments, for any of the source WTRU and the target WTRU, a same security context as already used for the first link via the first relay WTRU may be re-used for the second link via the selected relay WTRU.

According to embodiments, for any of the source WTRU and the target WTRU, the link modification request message may comprise any of a reason indication, a security establishment method indication and security parameters.

According to embodiments, for any of the source WTRU and the target WTRU, the security establishment method indication may indicate establishing a security context for the second link according to security parameters included in the link modification request message. The security context for the second link may be established before establishing the second link via the selected relay WTRU.

According to embodiments, for any of the source WTRU and the target WTRU, the link modification request message may indicate establishing a security context for the second link when establishing the second link via the selected relay WTRU.

FIG. 14 is a diagram illustrating an example of a (e.g., Layer 3 based) method 1400 for changing of relay, in a source WTRU. According to embodiments, in step 1410, a link modification request message may be transmitted by the source WTRU on a first link to a first relay WTRU for being forwarded to a target WTRU for requesting a change of relay. For example, the link modification request message may comprise first information indicating any of a relay reselection indication and a list of candidate relay identifiers.

According to embodiments, transmitting the link modification request message may be based on detecting a condition for the change of relay. According to embodiments, transmitting the link modification request message may be based on receiving a trigger for the change of relay from the first relay WTRU. According to embodiments, the trigger for the change of relay may comprise an initial link modification request message received from the first relay WTRU.

According to embodiments, in step 1430, a link modification accept message may be received by the source WTRU on the first link from the first relay WTRU, the link modification accept message originating from the target WTRU. For example, the link modification accept message may comprise second information indicating any of a relay reselection indication, an identifier of a selected relay WTRU, and a target WTRU IP address for communication between the source WTRU and the target WTRU via the selected relay WTRU.

According to embodiments, in step 1440, a link modification acknowledge message may be transmitted by the source WTRU on the first link to the first relay WTRU for being forwarded to the target WTRU for acknowledging the change of relay. For example, the link modification acknowledge message may comprise third information indicating any of a source WTRU IP address for communication between the source WTRU and the target WTRU via the selected relay WTRU.

According to embodiments, in step 1450, IP traffic (e.g., directed to the target WTRU) may be switched by the source WTRU from the first link to a second link via the selected relay WTRU.

FIG. 15 is a diagram illustrating an example of a (e.g., Layer 3 based) method 1500 for changing of relay, in a target WTRU. According to embodiments, in step 1510, a link modification request message may be received by the target WTRU on a first link from a first relay WTRU, the link modification request message originating from a source WTRU for requesting a change of relay. For example, the link modification request message may comprise first information indicating any of a relay reselection indication and a list of candidate relay identifiers.

According to embodiments, in step 1520, a relay WTRU may be selected by the target WTRU based on the list of candidate relay identifiers.

According to embodiments, in step 1530, a link modification accept message may be transmitted by the target WTRU on the first link to the first relay WTRU for being forwarded to the source WTRU. For example, the link modification accept message may comprise second information indicating any of a relay reselection indication, an identifier of the selected relay WTRU, and a target WTRU IP address for communication between the source WTRU and the target WTRU via the selected relay WTRU.

According to embodiments, in step 1540, a link modification acknowledge message may be received by the target WTRU on the first link from the first relay WTRU, the link modification acknowledge message originating from the source WTRU for acknowledging the change of relay. For example, the link modification acknowledge message may comprise third information indicating a source WTRU IP address for communication between the source WTRU and the target WTRU via the selected relay WTRU. According to embodiments, in step 1550, IP traffic (e.g., directed to the source WTRU) may be switched by the target WTRU from the first link to a second link via the selected relay WTRU.

According to embodiments, for any of the source WTRU and the target WTRU, the first information may further indicate any of a first source WTRU IP address and a first target WTRU IP address, the first source WTRU IP address and the first target WTRU IP address being used for communication between the source WTRU and the target WTRU via the first relay WTRU.

According to embodiments, for any of the source WTRU and the target WTRU, the second information may further indicate any of the first source WTRU IP address and the first target WTRU IP address used for communication between the source WTRU and the target WTRU via the first relay WTRU.

According to embodiments, for any of the source WTRU and the target WTRU, the list of candidate relay identifiers may comprise identifiers of candidate relays already having an established link with the source WTRU.

According to embodiments, for any of the source WTRU and the target WTRU, the selected relay WTRU (802) may be selected from the candidate relays of the list already having an established link with the target WTRU.

According to embodiments, for any of the source WTRU and the target WTRU, the first information may further indicate a plurality of target IP addresses of respectively a plurality of target WTRUs, with which the source WTRU may be communicating via the first relay WTRU.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM") or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a source wireless transmit/receive unit (WTRU), wherein a first link has been established between the source WTRU and a first relay WTRU and wherein a second link has been established between the source WTRU and a second relay WTRU, the method comprising:

transmitting a link modification request message on the first link to the first relay WTRU to be used by the first relay WTRU to transmit a corresponding link modification request message to a target WTRU, wherein the link modification request message is a request for a change of relay for the target WTRU, and wherein the link modification request message comprises a relay reselection indication, a list of candidate relay identifiers and a first Internet Protocol address of the target WTRU;

receiving a link modification accept message on the first link from the first relay WTRU that is based on a corresponding link modification accept message originating from the target WTRU, wherein the link modification accept message indicates that the target WTRU accepts the request for the change of relay, and wherein the link modification accept message comprises the relay reselection indication, an identifier of the second relay WTRU and a second Internet Protocol address of the target WTRU to be used for communication via the second relay WTRU;

transmitting a link modification acknowledge message on the first link to the first relay WTRU to be used by the first relay WTRU to transmit a corresponding link modification acknowledge message to the target WTRU, wherein the link modification acknowledge message acknowledges a target WTRU's acceptance of the request for the change of relay, and wherein the link modification acknowledge message comprises a second Internet Protocol address of the source WTRU to be used for communication via the second relay WTRU; and switching Internet Protocol traffic directed to the target WTRU from the first link to the second link via the second relay WTRU.

2. The method according to claim 1, wherein said transmitting the link modification request message is based on detecting a condition for the change of relay.

3. The method according to claim 1, wherein said transmitting the link modification request message is based on receiving, from the first relay WTRU, a trigger for the change of relay.

4. The method of claim 3, wherein receiving said trigger for the change of relay comprises receiving an initial link modification request message received from the first relay WTRU.

5. The method of claim 1, wherein when the source WTRU is communicating with multiple target WTRUs via the first relay WTRU, the source WTRU transmits a single link modification request message that includes in a same message, a respective IP address of each of the multiple target WTRUs.

6. The method of claim 1, wherein the link modification request message further indicates a first IP address of the source WTRU.

7. The method of claim 6, wherein the first IP address of the source WTRU and the second IP address of the source WTRU are a same IP address.

8. The method of claim 6, wherein the first IP address of the source WTRU is different from the second IP address of the source WTRU.

9. The method of claim 1, wherein the first IP address of the target WTRU and the second IP address of the target WTRU are a same IP address.

10. The method of claim 1, wherein the first IP address of the target WTRU is different from the second IP address of the target WTRU.

11. A source wireless transmit/receive unit (WTRU), wherein a first link has been established between the source WTRU and a first relay WTRU and wherein a second link has been established between the source WTRU and a second relay WTRU, the source WTRU comprising:

a processor; and a transceiver operatively coupled to the processor, the processor being configured to:

transmit a link modification request message on the first link to the first relay WTRU to be used by the first relay WTRU to transmit a corresponding link modification request message to a target WTRU, wherein the link modification request message is a request for a change of relay for the target WTRU, and wherein the link modification request message comprises a relay reselection indication, a list of candidate relay identifiers and a first Internet Protocol address of the target WTRU;

receive a link modification accept message on the first link from the first relay WTRU that is based on a corresponding link modification accept message originating from the target WTRU, wherein the link modification accept message indicates that the target WTRU accepts the request for the change of relay, and wherein the link modification accept message comprises the relay reselection indication, an identifier of the second relay WTRU and a second Internet Protocol address of a target WTRU to be used for communication via the second relay WTRU;

transmit a link modification acknowledge message on the first link to the first relay WTRU to be used by the first relay WTRU to transmit a corresponding link modification acknowledge message to the target WTRU, wherein the link modification acknowledge message acknowledges a target WTRU's acceptance of the request for the change of relay, and wherein the link modification acknowledge message comprises a second Internet Protocol address of the source WTRU to be used for communication via the second relay WTRU; and switch Internet Protocol traffic directed to the target WTRU from the first link to the second link via the second relay WTRU.

12. The source WTRU according to claim 11, wherein being configured to transmit the link modification request message comprises being configured to transmit the link modification request message based on detecting a condition for the change of relay.

13. The source WTRU according to claim 11, wherein being configured to transmit the link modification request message comprises being configured to transmit the link modification request message based on receiving a trigger for the change of relay from the first relay WTRU.

14. The source WTRU of claim 13, wherein being configured to receive said trigger for the change of relay comprises being configured to receive an initial link modification request message from the first relay WTRU.

15. The source WTRU of claim 11, wherein when the source WTRU is communicating with multiple target WTRUs via the first relay WTRU, the source WTRU transmits a single link modification request message that includes in a same message a respective IP address of each of the multiple target WTRUs.

16. The source WTRU of claim 11, wherein the link modification request message further indicates a first IP address of the source WTRU via the first relay WTRU.

17. The source WTRU of claim 16, wherein the first IP address of the source WTRU and the second IP address of the source WTRU are a same IP address.

18. The source WTRU of claim 16, wherein the first IP address of the source WTRU is different from the second IP address of the source WTRU.

19. The source WTRU of claim 11, wherein the first IP address of the target WTRU and the second IP address of the target WTRU are a same IP address.

20. The source WTRU of claim 11, wherein the first IP address of the target WTRU is different from the second IP address of the target WTRU.

* * * * *